(12) United States Patent
Chawla et al.

(10) Patent No.: US 12,298,914 B2
(45) Date of Patent: May 13, 2025

(54) MULTI-LOG CHECKPOINT-BASED RETIREMENT TRANSACTION ORDER IN MULTI-CHUNK LOG

(71) Applicant: Dell Products L.P., Round Rock, TX (US)

(72) Inventors: Rohit K Chawla, Scotch Plains, NJ (US); Morgan A Clark, South Orange, NJ (US); Marc A De Souter, Wayne, NJ (US)

(73) Assignee: DELL PRODUCTS L.P., Round Rock, TX (US)

( * ) Notice: Subject to any disclaimer, the term of this patent is extended or adjusted under 35 U.S.C. 154(b) by 69 days.

(21) Appl. No.: 18/453,644

(22) Filed: Aug. 22, 2023

(65) Prior Publication Data

US 2025/0068570 A1    Feb. 27, 2025

(51) Int. Cl.
G06F 7/00      (2006.01)
G06F 12/12     (2016.01)
G06F 16/17     (2019.01)
G06F 16/18     (2019.01)

(52) U.S. Cl.
CPC .......... G06F 12/12 (2013.01); G06F 16/1734 (2019.01); G06F 16/1865 (2019.01)

(58) Field of Classification Search
CPC ............. G06F 16/1734; G06F 16/1865; G06F 16/2365; G06F 16/188; G06F 12/12
USPC ............... 707/639, 649, 645, 802, 826, 827, 707/999.01, E17.005; 709/213, 224, 225, 709/226, 229, 246; 711/103, 114, 141, 711/154, 156, 162, E12.008, E12.019
See application file for complete search history.

(56) References Cited

U.S. PATENT DOCUMENTS

| | | | |
|---|---|---|---|
| 9,697,219 B1 | 7/2017 | Wang et al. | |
| 2005/0097149 A1* | 5/2005 | Vaitzblit | G06F 16/2358 |
| 2007/0005665 A1* | 1/2007 | Vaitzblit | G06F 16/20 |
| 2014/0195480 A1* | 7/2014 | Talagala | G06F 16/2365 |
| | | | 707/610 |

(Continued)

OTHER PUBLICATIONS

Chawla, et al "Multiple Bitmap Single Head/Tail Retirement Transaction Order" U.S. Appl. No. 18/453,672, filed Aug. 22, 2023, 66 pages.

(Continued)

Primary Examiner — Md I Uddin
(74) Attorney, Agent, or Firm — Amin, Turocy & Watson, LLP

(57) ABSTRACT

Described is technology that facilitates journalling a transaction log entry to chunks of storage while allowing for obtaining of modified system metadata associated therewith in the case of a computing device issue. An associated method comprises at least storing, by a system operatively coupled to a processor, a set of transaction log entries at log space of a storage log associated with a file system, wherein the transaction log entries comprise instructions for fulfilling a set of transactions, and wherein the transactions define changes to the file system, generating a checkpoint marker corresponding to a set of log storage objects of the storage log at which the transaction log entries are stored, and based on the checkpoint marker, preventing, by the system, reuse of the log space until writing of all modified system metadata corresponding to the transaction log entries has been executed.

20 Claims, 14 Drawing Sheets

(56) References Cited

U.S. PATENT DOCUMENTS

| | | | |
|---|---|---|---|
| 2015/0309739 A1* | 10/2015 | Sato | G06F 11/1451 |
| | | | 711/162 |
| 2016/0078085 A1* | 3/2016 | Hu | G06F 16/273 |
| | | | 707/765 |
| 2018/0081957 A1 | 3/2018 | Johnston | |
| 2018/0300236 A1 | 10/2018 | Xu et al. | |
| 2020/0226035 A1* | 7/2020 | Li | G06F 11/1446 |

OTHER PUBLICATIONS

Non-Final office action received for U.S. Appl. No. 18/453,672 dated Jan. 14, 2025, 64 pages.

* cited by examiner

700 →

```
JOURNALING, BY A SYSTEM OPERATIVELY COUPLED TO A PROCESSOR, A
TRANSACTION ENTRY LOG TO LOG STORAGE OBJECTS DEFINING MULTIPLE CHUNKS
OF A STORAGE LOG ASSOCIATED WITH A FILE SYSTEM, WHEREIN THE TRANSACTION
ENTRY LOG COMPRISES INSTRUCTIONS FOR FULFILLING A TRANSACTION, AND
WHEREIN THE TRANSACTION DEFINES A CHANGE TO THE FILE SYSTEM. 702
```
↓
```
MODIFYING, BY THE SYSTEM, A SET OF MEMORY BUFFERS TO COMPRISE MODIFIED
SYSTEM METADATA FOR UPDATING THE FILE SYSTEM, WHEREIN THE MODIFIED
SYSTEM METADATA IS TO BE SYNCHRONIZED TO PERSISTENT STORAGE TO COMPLETE
THE TRANSACTION. 704
```
↓
```
IN CONNECTION WITH THE MODIFYING OF THE SET OF MEMORY BUFFERS,
GENERATING, BY THE SYSTEM (E.G., LOG HOLD COMPONENT 212), A SET OF LOG
HOLDS (E.G., LOG HOLDS 180) CORRESPONDING TO THE SET OF MEMORY BUFFERS. 706
```
↓
```
MAINTAINING, BY THE SYSTEM, THE SET OF LOG HOLDS UNTIL THE MODIFIED
SYSTEM METADATA OF THE MEMORY BUFFERS OF A FIRST DIRTY LIST OF MEMORY
BUFFERS HAS BEEN SYNCHRONIZED TO THE PERSISTENT STORAGE. 708
```
↓
```
POPULATING, BY THE SYSTEM, THE FIRST DIRTY LIST OF MEMORY BUFFERS WITH
REFERENCE HINTS THAT REPRESENT THE SET OF MEMORY BUFFERS THAT
CORRESPOND TO THE TRANSACTION AND THAT COMPRISE THE MODIFIED SYSTEM
METADATA NOT YET SYNCHRONIZED TO PERSISTENT STORAGE. 710
```
↓
```
ASSIGNING, BY THE SYSTEM, A MARKER IDENTIFYING A CHECKPOINT IN THE
JOURNALING TO THE STORAGE LOG, WHEREIN THE CHECKPOINT CORRESPONDS TO
THE REFERENCE HINTS POPULATED PRIOR TO THE CHECKPOINT. 712
```
↓
```
SYNCHRONIZING, BY THE SYSTEM, THE MODIFIED SYSTEM METADATA OF MEMORY
BUFFERS THAT HAVE NOT YET BEEN SYNCHRONIZED TO THE PERSISTENT STORAGE.
714
```
↓
△ D

STORING, BY A SYSTEM OPERATIVELY COUPLED TO A PROCESSOR, A SET OF TRANSACTION ENTRY LOGS AT LOG SPACE OF A STORAGE LOG ASSOCIATED WITH A FILE SYSTEM, WHEREIN THE TRANSACTION ENTRY LOGS COMPRISE INSTRUCTIONS FOR FULFILLING A SET OF TRANSACTIONS, AND WHEREIN THE TRANSACTIONS DEFINE CHANGES TO THE FILE SYSTEM. 902

ASSIGNING, BY THE SYSTEM, A CHECKPOINT MARKER CORRESPONDING TO A SET OF LOG STORAGE OBJECTS OF THE STORAGE LOG AT WHICH THE TRANSACTION ENTRY LOGS ARE STORED. 904

BASED ON THE CHECKPOINT MARKER, PREVENTING, BY THE SYSTEM, REUSE OF THE LOG SPACE UNTIL WRITING OF ALL MODIFIED SYSTEM METADATA CORRESPONDING TO THE TRANSACTION ENTRY LOGS HAS BEEN EXECUTED. 906

GENERATING, BY THE SYSTEM, A SET OF LOG HOLDS CORRESPONDING TO THE SET OF LOG STORAGE OBJECTS ENABLING THE LOG SPACE. 908

MAINTAINING, BY THE SYSTEM, THE LOG HOLDS TO PREVENT THE REUSE OF THE LOG SPACE. 910

EMPLOYING, BY THE SYSTEM, A SET OF LISTS ASSOCIATED WITH THE CHECKPOINT MARKER, WHEREIN THE LISTS REFERENCE A SET OF MEMORY BUFFERS THAT COMPRISE THE MODIFIED SYSTEM METADATA, AND WHEREIN THE LISTS PROVIDE FOR TRACKING OF THE PROGRESS OF SYNCHRONIZATION OF THE MODIFIED SYSTEM METADATA FROM THE SET OF MEMORY BUFFERS. 912

PREVENTING, BY THE SYSTEM, THE REUSE OF THE LOG SPACE UNTIL A SET OF REFERENCE HINTS, CORRESPONDING TO THE SET OF MEMORY BUFFERS, HAVE BEEN TRANSITIONED THROUGH THE SET OF LISTS. 914

EXECUTING, BY THE SYSTEM, THE WRITING OF THE MODIFIED SYSTEM METADATA TO THE PERSISTENT STORAGE AT SELECTED INTERVALS NOT DRIVEN BY THE ASSIGNING OF THE CHECKPOINT MARKER. 916

AS A RESULT OF THE WRITING OF THE MODIFIED SYSTEM METADATA TO THE PERSISTENT STORAGE, IDENTIFYING, BY THE SYSTEM, THE LOG SPACE COMPRISING THE TRANSACTION ENTRY LOGS AS BEING AVAILABLE TO BE RELEASED BY THE SYSTEM. 918

POPULATING, BY A SYSTEM OPERATIVELY COUPLED TO A PROCESSOR, A FIRST DIRTY LIST OF MEMORY BUFFERS WITH REFERENCE HINTS REFERRING TO MEMORY BUFFERS COMPRISING MODIFIED SYSTEM METADATA FOR BEING SYNCHRONIZED TO PERSISTENT STORAGE TO FULFILL ONE OR MORE TRANSACTIONS AT A FILE SYSTEM. 1102

EXECUTING, BY THE SYSTEM, THE POPULATING OF THE FIRST DIRTY LIST OF MEMORY BUFFERS IN CONNECTION WITH THE JOURNALING OF ONE OR MORE TRANSACTION LOG ENTRIES AND MODIFICATION OF THE MEMORY BUFFERS TO COMPRISE THE MODIFIED SYSTEM METADATA. 1104

ASSIGNING, BY THE SYSTEM, A CHECKPOINT MARKER UPON COMPLETION OF JOURNALING OF THE ONE OR MORE TRANSACTION LOG ENTRIES, CORRESPONDING TO THE ONE OR MORE TRANSACTIONS, TO PLURAL CHUNKS OF A STORAGE SYSTEM ASSOCIATED WITH THE FILE SYSTEM. 1106

IN ASSOCIATION WITH THE CHECKPOINT MARKER, TRANSITIONING, BY THE SYSTEM, THE REFERENCE HINTS TO A SECOND RETIRED LIST OF MEMORY BUFFERS UPON THE SYNCHRONIZATION OF THE MODIFIED SYSTEM METADATA, WHICH IS ASSOCIATED WITH AN INDIVIDUAL ONE OR MORE MEMORY BUFFERS OF THE MEMORY BUFFERS, TO THE PERSISTENT STORAGE. 1108

UPON SYNCHRONIZATION OF ALL MODIFIED SYSTEM METADATA OF THE MEMORY BUFFERS ASSOCIATED WITH THE CHECKPOINT MARKER, AND THUS ASSOCIATED WITH THE ONE OR MORE TRANSACTION LOG ENTRIES, EXECUTING, BY THE SYSTEM, A GROUP TRANSITIONING OF THE REFERENCE HINTS TO A THIRD TRASH LIST OF MEMORY BUFFERS. 1110

TRANSITIONING, BY THE SYSTEM, ONLY THE REFERENCE HINTS ASSOCIATED WITH THE MEMORY BUFFERS ASSOCIATED WITH THE CHECKPOINT MARKER TO THE SECOND RETIRED LIST AND THIRD TRASH LIST. 1112

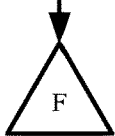

FIG. 11

MULTI-LOG CHECKPOINT-BASED RETIREMENT TRANSACTION ORDER IN MULTI-CHUNK LOG

BACKGROUND

Various operations of a computing system can employ modification to multiple logs or to multiple chunks of a log, where one log/chunk is modified at a different time or at least partially at a same time as another log chunk. The intent of the one or more logs is to allow for all changes/updates to be made together. That is, the one or more logs can allow for the consistency of a file system to be maintained.

REFERENCE TO RELATED APPLICATIONS

This application is related to U.S. patent application Ser. No. 18/453,672, filed Aug. 22, 2023, and entitled "MULTIPLE BITMAP SINGLE HEAD/TAIL RETIREMENT TRANSACTION ORDER."

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the disclosure in a streamlined form as a prelude to the more detailed description that is presented later.

An example system can comprise a processor, and a memory that stores executable instructions that, when executed by the processor, facilitate performance of operations, comprising journalling a transaction log entry to log storage objects defining multiple chunks of a storage log associated with a file system, wherein the transaction log entry comprises instructions for fulfilling a transaction, and wherein the transaction defines a change to the file system; modifying a set of memory buffers to comprise modified system metadata for updating the file system, wherein the modified system metadata is to be synchronized to persistent storage to fulfill the transaction; populating a first dirty list of memory buffers with reference hints that represent the set of memory buffers that correspond to the transaction and that comprise the modified system metadata not yet synchronized to persistent storage; generating a marker identifying a checkpoint in the journalling to the storage log, wherein the checkpoint corresponds to the reference hints populated prior to the checkpoint; and synchronizing the modified system metadata of memory buffers that have not yet been synchronized to the persistent storage.

An example method can comprise storing, by a system operatively coupled to a processor, a set of transaction log entries at log space of a storage log associated with a file system, wherein the transaction log entries comprise instructions for fulfilling a set of transactions, and wherein the transactions define changes to the file system; generating, by the system, a checkpoint marker corresponding to a set of log storage objects of the storage log at which the transaction log entries are stored; and based on the checkpoint marker, preventing, by the system, reuse of the log space until writing of all modified system metadata corresponding to the transaction log entries has been executed.

An example non-transitory computer-readable medium can comprise executable instructions that, when executed by a processor, can facilitate performance of operations. The operations can comprise populating a first dirty list of memory buffers with reference hints referring to memory buffers comprising modified system metadata for being synchronized to persistent storage to fulfill one or more transactions at a file system; generating a checkpoint marker upon completion of journalling of one or more transaction log entries, corresponding to the one or more transactions, to plural chunks of a storage system associated with the file system; in association with the checkpoint marker, transitioning the reference hints to a second retired list of memory buffers upon the synchronization of the modified system metadata, that is associated with an individual one or more memory buffers of the memory buffers, to the persistent storage; and upon synchronization of all modified system metadata of the memory buffers associated with the checkpoint marker, and thus associated with the one or more transaction log entries, executing a group transitioning of the reference hints to a third trash list of memory buffers.

An example benefit of one or more of the above-indicated method, system and/or non-transitory computer-readable medium can be reduction in the number of validations performed to allow for release of log storage objects of the storage log. For example, the one or more embodiments herein can employ a checkpoint-based system that is associated with a set of lists for tracking synchronization of modified system metadata, to fulfill a transaction of the file system, to persistent storage. The tracking can also be employed for triggering subsequent release of log space corresponding to the transaction, list space corresponding to the set of lists, and resetting of the heads and tails of the plural chunks of the storage system. That is, a validation at each persistent storage write of each chunk of modified system metadata (e.g., from a single one or more memory buffers), to determine if modified system metadata from all previous log storage objects in a transaction sequence order have been written, as performed in existing frameworks, can be omitted via the one or more embodiments described herein.

Another example benefit can be functioning without a global bitmap, head or tail for the set of chunks, which global bitmap, head or tail can impede scalability of the one or more embodiments described herein. By using a set of log holds and maintaining transaction entry metadata defining transactions at corresponding log storage objects (e.g., defining the log), order of writes to persistent storage can be omitted and the log chunks (also herein referred to as chunks) can be initially journalled, and subsequently memory buffers can be synchronized, in any suitable order, even at least partially in parallel with one another (e.g., at least partially concurrently with one another). This is in contrast to existing frameworks where transaction meta data is cleared in specific order from the storage log upon synchronization.

BRIEF DESCRIPTION OF THE DRAWINGS

The technology described herein is illustrated by way of example and not limited in the accompanying figures in which like reference numerals indicate similar elements.

FIG. 7 illustrates a process flow diagram of a method of tracking of synchronizing of modified system metadata to persistent storage and of subsequent clearing of storage log space, in accordance with one or more embodiments and/or implementations described herein.

FIG. 9 illustrates a process flow diagram of a method of tracking of synchronizing of modified system metadata to persistent storage and of subsequent clearing of storage log space, in accordance with one or more embodiments and/or implementations described herein.

FIG. 10 illustrates a continuation of the process flow diagram of FIG. 9 of a method of tracking of synchronizing of modified system metadata to persistent storage and of subsequent clearing of storage log space, in accordance with one or more embodiments and/or implementations described herein.

FIG. 11 illustrates a process flow diagram of a method of tracking of synchronizing of modified system metadata to persistent storage and of subsequent clearing of storage log space, in accordance with one or more embodiments and/or implementations described herein.

DETAILED DESCRIPTION

Overview

Figure 1:
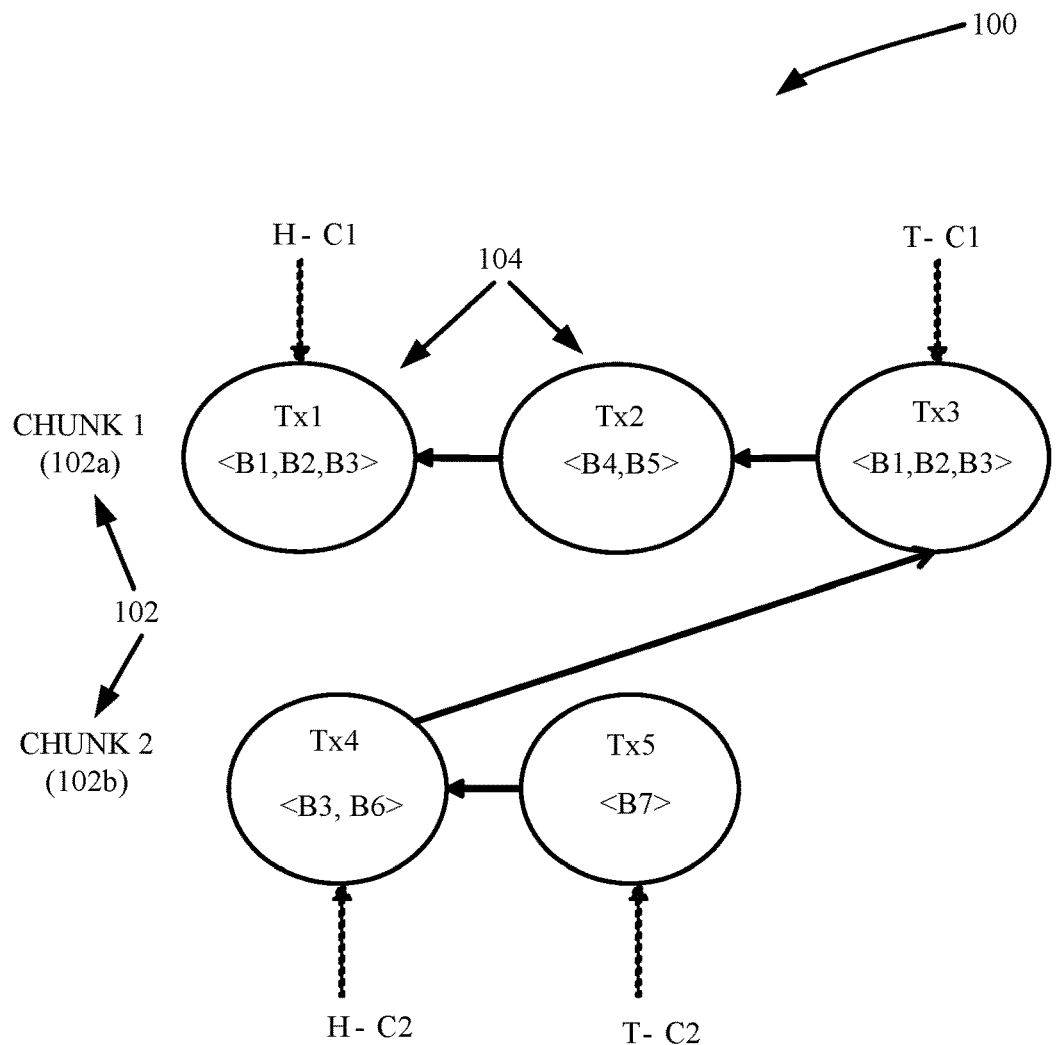
FIG. 1 illustrates a block diagram of a set of transactions that have been journalled to plural chunks of a storage log, in accordance with one or more embodiments and/or implementations described herein.

The technology described herein is generally directed towards systems, methods and/or computer program products for facilitating use of, and resetting of, a storage log and of log storage blocks enabling the storage log.

As noted above, various operations of a file system can employ modification to multiple logs or to multiple chunks of a log, where one log/chunk is modified at a different time or at least partially at a same time as another log chunk. An intent of the one or more logs (or one or more chunks) is to allow for rapid writing of metadata to the storage logs, while still enabling all changes/updates of metadata by different operations to be made in parallel with one another. That is, the one or more logs can continue to allow for the consistency of the file system to be maintained.

If the computing system crashes, power failure occurs, and/or the like, the one or more storage logs are the source of re-obtaining the metadata updates/changes. In the case of modification to multiple logs or to multiple chunks of a same log, maintaining the in-memory buffers of the metadata of the transactions in order and without having deleted one or more sections thereof can be costly in terms of CPU bandwidth, memory, validation actions, etc.

An existing approach can be to employ only a single chunk per log. The head of the chunk is not moved through a transaction of multiple transactions of the log until the transaction is synchronized (e.g., modified system metadata of memory buffers corresponding to the transaction is written to persistent storage). If the system crashes, the log can be replayed. However, a single chunk log or global log is not scalable and often becomes a bottleneck of operations.

Furthermore, when journalling to multiple chunks, each chunk cannot be treated independently when data journalled to one chunk can be dependent upon metadata journalled to another chunk. That is, if one chunk is synchronized first (e.g., if metadata corresponding to transactions in one chunk) and then the log storage objects cleared, this can cause an update (e.g., in response to a system crash) to fail (e.g., cause inconsistency in the file system) due to one or more cross-chunk dependencies having been deleted.

To account for one or more deficiencies of existing approaches, described herein are one or more embodiments that can employ multi-chunk storage logs (e.g., storage logs with multiple chunks) and which can maintain a set of log holds and memory buffer lists in place of use of a costly global log. Furthermore, a checkpoint is employed, per set of one or more transactions journalled to a storage log, for directing the proceeding to next steps (e.g., releasing of storage objects) rather than using continuous validation actions intending to keep a global order of buffers to write before releasing the log space, as is done in existing frameworks. A set of checkpoints can enable metadata of a file system being updated to be consistent both before and after a set of updates.

For example, in one or more embodiments described herein, to make a change to system metadata of a file system, such as by writing new metadata, e.g., modified system metadata, to persistent storage, a storage system, such as a storage log system, can be employed. When making the change to the file system, it is desired that the system metadata be consistent both before and after the change (also herein referred to as an update). Such change to a file system can comprise various sub-changes that together are performed at various aspects of the file system to elicit the change. To aid in managing these various sub-changes, one or more transactions can be journalled to one or more chunks of a storage system, such as a storage log. The one or more transactions can be journalled in the form of one or more transaction log entries comprising and defined by transaction entry metadata. The storage log is not the permanent repository for the change to the filing system, and thus, in one or more embodiments, one or more memory buffers can be written out with the modified system metadata and the memory buffers synchronized to persistent storage (e.g., the modified system metadata is written to the permanent location on the persistent storage).

That is, a system described herein can journal to the multiple chunks of a storage log in parallel with one another. Each chunk can be synchronized to persistent storage separately or at least partially in parallel with one another. A set of log holds can be employed to maintain the initial transaction entry metadata of the transaction log entries at the log storage objects enabling and/or providing for the multiple chunks. A checkpoint can be employed to identify a set of memory buffers corresponding to a set of transaction log entries. A set of buffer lists can be employed to track the synchronizing of the memory buffers corresponding to the transaction log entries, and further to track the release of the log storage objects comprising the journalled transaction log entries. Transition of reference hints along the set of buffer lists, and representing the set of memory buffers, can be executed upon reaching a threshold of journalling at the storage log. The synchronization of the memory buffers can be executed at other selected intervals, such as not associated with any checkpoint, or in one or more other embodiments, a start of the synchronization can be triggered based on the generation of the checkpoint. At the end of an iteration of log use and subsequent metadata synchronization to persistent storage, the log holds can be released, allowing for the log storage objects, in-memory buffers and list storage objects (comprising metadata defining the reference hints) to be freed to make their respective space available for new transactions to be written to the storage log in the form of transaction log entries.

That is, to ensure that, in the case of a file system or computing device issue, the file system metadata is consistent before the update of the file system, the set of log holds can allow for maintaining transaction entry metadata of transactions written to the storage log, without the storage log space defining the storage log being preemptively cleared. As such, modified system metadata not yet synchronized is able to be replayed by the system in the case of such issue.

Further, to ensure that, in the case of a file system or computing device issue, the file system metadata is consistent after the update of the file system, the checkpoint and the memory buffer lists can allow for tracking of dirty (e.g., non-synchronized) memory buffers and subsequent release of storage log space once the modified system metadata has been synchronized to the persistent storage. As such, old metadata (e.g., the transaction entry metadata and modified system metadata becomes old after synchronization of the modified system metadata) is not erroneously employed to update the file system.

In these ways, validation cost is not incurred by the one or more embodiments described herein. This is counter to validation in existing frameworks, which validation is continually performed. Furthermore, a global bitmap, head or tail are not employed by the one or more embodiments described herein, allowing for scalability of the one or more embodiments described herein.

It is appreciated that where the description provided herein refers to multiple chunks of a log, the one or more embodiments are also applicable to multiple single chunk logs or to multiple logs where one or more of the multiple logs has multiple chunks. That is, the one or more embodiments can be scaled to increasing numbers of chunks, increasing numbers of logs, or increasing numbers of logs with one or more such logs having multiple chunks.

It also is appreciated that where the description provided herein refers to a log or storage log, the description likewise can refer alternatively to any other storage space or named storage space type (drive, jump drive, internal or external media, etc.) that is internal or external to a respective file system employing the storage space or named storage space type.

The one or more embodiments described herein can be employed cooperatively with an operation system that comprises one or more computing systems having one or more hardware devices and one or more file systems.

Terminology

As used herein, the terms "cost" or "expense" can refer to power, memory and/or processing power.

As used herein, the term "data" can comprise "metadata."

Reference throughout this specification to "embodiment," "one embodiment," "an embodiment," "one implementation," and/or "an implementation," means that a feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the features, structures, or characteristics may be combined in any suitable manner in one or more embodiments/implementations.

As used herein, the terms "employing" or "employed by" can refer to an element (e.g., a hardware device) that is currently being employed, that has already been employed and/or that is to be employed.

As used herein, the term "entity" can refer to a machine, device, smart device, component, hardware, software and/or human.

A "group of hardware" can refer to a subset of hardware devices of an operation system, which hardware devices can comprise, but are not limited to, storage nodes, switch nodes, server nodes and/or assembly devices, and which operation system can comprise one or more computing systems.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, a "memory buffer" is a temporary storage area in a memory that stores metadata transferring between two or more locations, such as between an application and a device location.

As used herein, the term "power" can refer to electrical and/or other source of power available to the operation system.

As used herein, the term "resource" can refer to power, money, memory, CPU bandwidth, processing power, labor, hardware and/or software.

As used herein, the term "set" can refer to one or more.

As used herein, "synchronization" of memory buffers, of chunks, of logs, and/or of modified system metadata can refer to the writing of modified system metadata to persistent storage, which modified system metadata corresponds to a result of and/or is based on transactional operations defined by the transactions being carried out at/for/in relation to a file system.

As used herein, a "transaction log entry" refers to an entry to a storage log (e.g., present in the log) that defines a transaction. The transaction log entry comprises and is defined by transaction entry metadata, and thus a transaction likewise comprises transaction entry metadata.

Example Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any order, connection and/or coupling of systems, devices and/or components depicted therein. For example, in one or more embodiments, the non-limiting system architectures described, and/or systems thereof, can further comprise one or more computer and/or computing-based elements described herein with reference to an operating environment, such as the operating environment 1300 illustrated at FIG. 13. In one or more described embodiments, computer and/or computing-based elements can be used in connection with implementing one or more of the systems, devices, components and/or computer-implemented operations shown and/or described in connection with FIGS. 1-12 and/or with other figures described herein.

Turning first to FIG. 1, a non-limiting architecture is illustrated comprising a set of chunks 102 of a storage log 100, where each chunk 102 comprises a head (H) and a tail (T). Chunk 1 (102*a*) comprises a head H-C1 and a tail T-C1. Chunk 2 (102*b*) comprises a head H-C2 and a Tail T-C2.

The chunks 102, and thus the storage log 100, comprise a set of transactions 104 (e.g., transactions Tx1, Tx2, Tx3, Tx4 and Tx5). Transaction log entries, comprised by transaction entry metadata, and defining these transactions 104, have been journalled to the storage log 100 comprising the multiple chunks 102 (e.g., a first chunk 102*a* and a second chunk 102*b*). As illustrated, transaction entry metadata has been journalled to both chunks 102*a* and 102*b*. Chunk 1 comprises transactions Tx1, Tx2 and Tx3. Chunk 2 comprises transactions Tx4 and Tx5.

The transaction entry metadata has been journalled for the purpose of being executed (e.g., the instructions defined by the transaction log entries corresponding to the transactions are to be executed), resulting in one or more actions at a file system associated with the storage log 100. The one or more actions result in the writing of modified system metadata to persistent storage. That is, the modified system metadata is a result of and/or is based on transactional operations being carried out and corresponding to the transactions. Generally, this process is referred to herein as synchronizing of the modified system metadata. Modified system metadata is written to persistent storage, using a set of memory buffers to aid the writing, to be further described below relative to FIG. 2.

As illustrated, many of the transactions 104 comprise plural blocks or other portions defining the respective transactions 104. For example, Tx1 comprises blocks B1, B2 and B3; Tx2 comprises blocks B4 and B5; Tx3 comprises blocks B1, B2 and B3; Tx4 comprises Blocks B3 and B6; and Tx5 comprises block B7. As used herein, these "blocks" can refer to separate log storage objects enabling storage space defining the storage log 100.

Also as illustrated, one or more transactions comprise the same one or more blocks. For example, block B3 is comprised by Tx1, Tx3 and Tx4. That is, block B3 is first written when journalling transaction Tx1. Block B3 is then updated two times, when journalling Tx3 and when writing Tx4. For synchronization purposes of this transaction entry metadata, both chunks can be synchronized at least partially at the same time. As such, there are numerous transaction (Tx) dependencies 150 even in the small exemplary storage log embodiment illustrated. These dependencies 150 can comprise Tx3 being explicitly dependent on Tx1, Tx4 being explicitly dependent Tx3, Tx2 being implicitly dependent on Tx1, Tx3 being implicitly dependent on Tx1, and Tx5 being implicitly dependent on Tx4.

Accordingly, in a case where a file system, or computing system comprising the file system, fails, regeneration of the modified system metadata can be performed by scanning the chunks 102 of the storage log 100. However, if one chunk is missing, if chunk 1 or chunk 2 has already been synchronized and the respective data storage blocks cleared, or if a transaction Tx having a dependency has already been synchronized and the respective data storage blocks cleared, it can be impossible to re-generate a cleared transaction log entry from the remaining transaction log entries alone.

Further, in an existing framework, a validation of all remaining transactions and blocks can be performed each time that a block has been synchronized and is ready to be cleared. This continuous validation can employ an undesired amount of resources including memory, CPU bandwidth, time, processing power, etc. Indeed, when synchronizing thousands of logged transactions, transaction log entries or transactions blocks at a time, across many storage logs and chunks, such validation process does not scale well and indeed can be a bottleneck causing reduced processing traffic, stalling out operations, causing system, application or microservice failure, and/or the like.

Differently, the one or more embodiments described herein can account for one or more of these deficiencies and can employ a system of checkpoints, log holds and memory buffer lists to segregate sets of transactions, track the synchronization of associated modified system metadata, and determine when to release log storage objects to which the transactions are journalled (e.g., as transaction log entries).

For example, a set of log holds 180 can be employed to account for the transaction (Tx) dependencies 150. A separate log hold 180 can be employed for each block of a transaction 104, and thus each transaction 104 can have plural log holds corresponding to the transaction 104. As illustrated, a log hold 180 can be generated for a respective block at a first instance of use of that block. For example, a log hold 180 can be generated for block B1 with respect to Tx1, and thus the same log hold is already in place when the synchronization of the chunk 102*a* moves to transaction Tx3 and to the updating of block B1 relative thereto.

Figure 2:
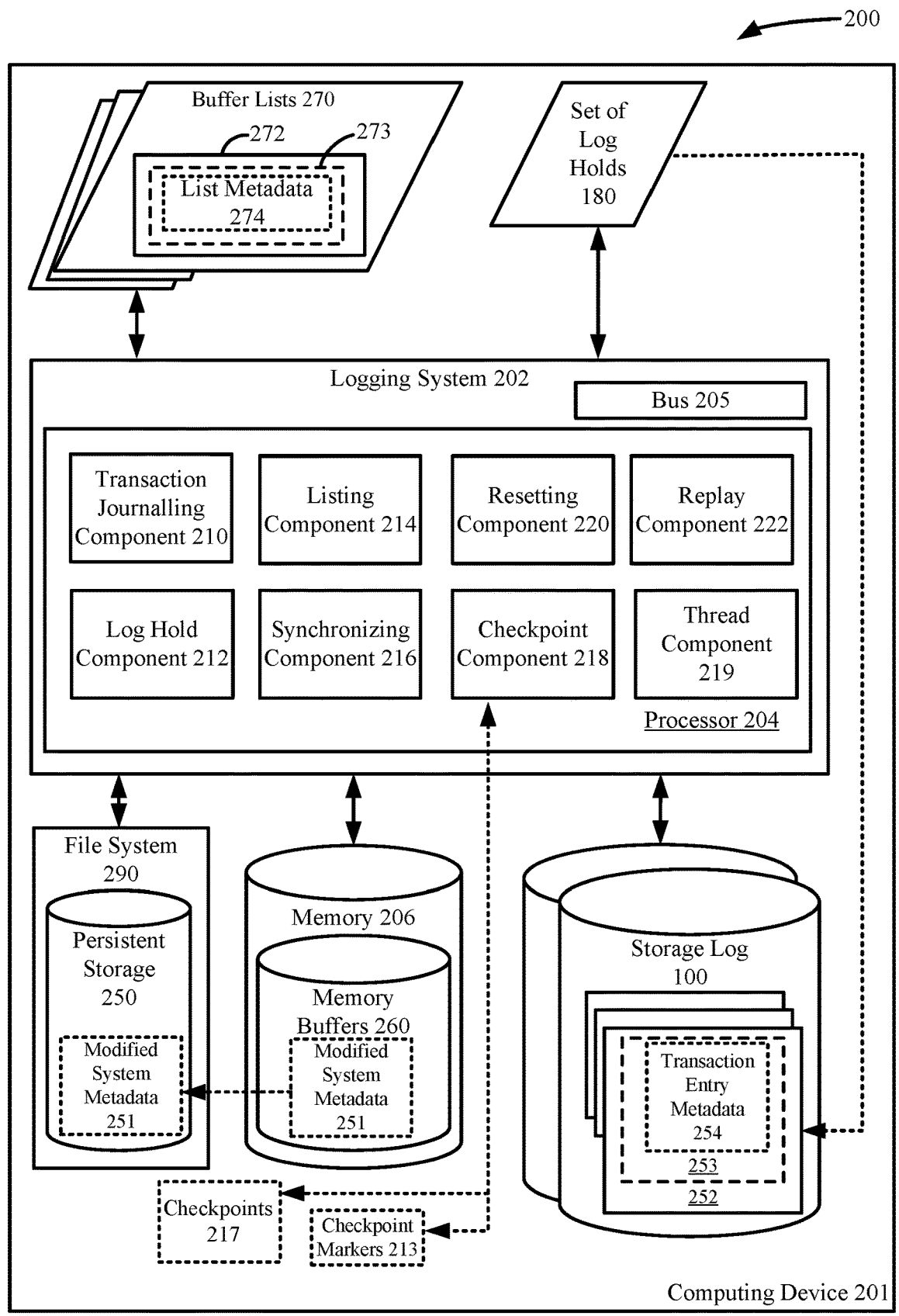
FIG. 2 illustrates a block diagram of a non-limiting computing system comprising a logging system for facilitating the synchronizing of modified system metadata corresponding to the transactions of FIG. 1 to persistent storage, in accordance with one or more embodiments and/or implementations described herein.

Turning next to FIG. 2, description turns to a non-limiting architecture 200 comprising a logging system 202 that can function to manage the synchronization of transactions 104 of a file system 290 corresponding to one or more chunks of one or more storage logs (e.g., storage log 100) to persistent storage (e.g., persistent storage 250). While referring here to one or more processes, operations, facilitations and/or uses of the non-limiting system 200, description provided herein, above and/or below also can be relevant to one or more other non-limiting system architectures described herein (e.g., of FIG. 1). Repetitive description of like elements and/or processes employed in respective embodiments is omitted for sake of brevity.

Generally, the logging system 202 can comprise any suitable computing devices, hardware, software, operating systems, drivers, network interfaces and/or so forth. As illustrated, the logging system 202 can comprise a transaction journalling component 210, log hold component 212, listing component 214, synchronizing component 216, checkpoint component 218, thread component 219, resetting component 220 and replay component 222. These components can be comprised by a processor 204 and/or one or more of these components can be external to the processor 204. A bus 205 operatively couples the processor 204 and a memory 206.

Communication among the components of the logging system 202 can be by any suitable method. Communication can be facilitated by wired and/or wireless methods including, but not limited to, employing a cellular network, a WAN (e.g., the Internet), and/or a LAN. Suitable wired or wireless technologies for facilitating the communications can include, without being limited to, Wi-Fi, GSM, UMTS, WiMAX, enhanced GPRS, 3GPPLTE, 3GPP2UMB, HSPA, ZIGBEE® and other 802. XX wireless technologies and/or legacy telecommunication technologies, BLUETOOTH®, SIP, RF4CE protocol, WirelessHART protocol, 6LoWPAN, Z-Wave, an ANT protocol, a UWB standard/protocol and/or other proprietary and/or non-proprietary communication protocols.

Discussion first turns to the processor 204, memory 206 and bus 205 of the logging system 202.

In one or more embodiments, the logging system 202 can comprise a processor 204 (e.g., computer processing unit, microprocessor, classical processor and/or like processor). In one or more embodiments, the processor 204 can be and/or be comprised by a controller.

In one or more embodiments, a component (which also can be referred to as a module) associated with logging system 202, as described herein with or without reference to the one or more figures of the one or more embodiments, can comprise one or more computer and/or machine readable, writable and/or executable components and/or instructions that can be executed by processor 204 to facilitate performance of one or more processes defined by such component and/or instruction.

In one or more embodiments, the logging system 202 can comprise a machine-readable memory 206 that can be operably connected to the processor 204. The memory 206 can store computer-executable instructions that, upon execution by the processor 204, can cause the processor 204 and/or one or more other components of the logging system 202 to perform one or more actions. In one or more embodiments, the memory 206 can store computer-executable components.

The logging system 202 and/or a component thereof as described herein, can be communicatively, electrically, operatively, optically and/or otherwise coupled to one another via a bus 205 to perform functions of non-limiting system architecture 200, logging system 202 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, logging system 202 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the logging system 202 can reside in the cloud, and/or can reside locally in a local computing environment (e.g., at a specified location).

In addition to the processor 204 and/or memory 206 described above, the logging system 202 can comprise one or more computer and/or machine readable, writable and/or executable components and/or instructions that, when executed by processor 204, can facilitate performance of one or more operations defined by such component and/or instruction.

Direction first turns to the transaction journalling component 210 that can journal the one or more transaction log entries 253, defined by transaction entry metadata 254, of one or more transactions 104 to the storage log 100. The journalling of the transaction log entries 253 can be by way of standard journalling process for data to one or more log storage objects 252, as understood by one having ordinary skill in the art.

In connection with FIG. 1, the storage log 100 can have multiple chunks 102. The storage log 100 can be part of and/or separate from a computing device 201 comprising the logging system 202. The journalling performed by and/or directed by the transaction journalling component 210 can be performed at two or more chunks at least partially at a same time.

Based on functioning of the logging system 202 allowing for scalability, the transaction journalling component 210 can switch the journalling of transaction log entries 253 for a set of transactions to a second storage log in response to usable log space at the first storage log being determined to have decreased and to have satisfied a defined usable log space threshold. The usable log space threshold can be defined by a user entity or administrator entity of the logging system 202 or computing device 201 and/or by the transaction journalling component 210.

Figure 3:
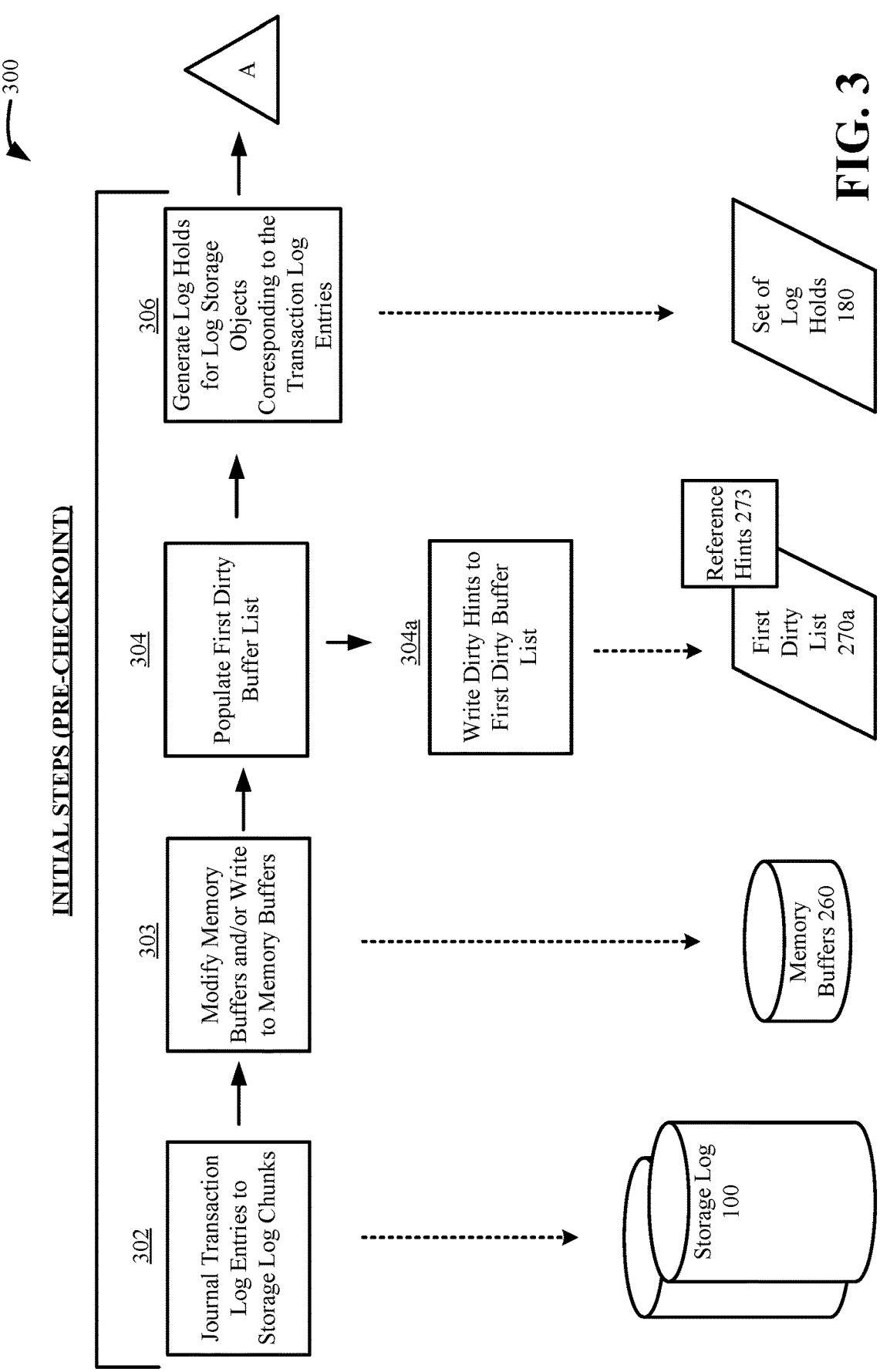
FIG. 3 illustrates a block diagram of a portion of operations that can be performed by the logging system of FIG. 2, in accordance with one or more embodiments and/or implementations described herein.

Turning now to FIG. 3, along with FIG. 2, a first subset of a set 300 of operations performed by the logging system 202 are illustrated. That is, during journalling of the transaction log entries 253 to the log storage objects 252 (e.g., blocks) at step 302, a set of log holds 180 can be generated by a log hold component 212 at step 306. Each log hold 180 can essentially provide a direct hold (and/or indirect hold by way of associated notification or other lock feature) to prevent clearing and re-use of a respective log storage object 252 until the log hold 180 has been released. As mentioned with respect to FIG. 1, a log hold 180 can be generated for each block or log storage object 252 employed or based on any other suitable unit. Data defining the log holds 180 can be stored at the respective log storage objects 252 and/or can be stored elsewhere, such as at the memory 206.

Put another way, the log holds 180 can be generated corresponding to a set of memory buffers 260 (e.g., in-memory buffers) that correspond to the log storage objects 252 and which represent the transaction entry metadata 254. The memory buffers 260 can be generated and/or employed by the transaction journalling component 210 and/or by any other suitable component. The memory buffers 260 serve as temporary storage in memory (e.g., at memory 206) for storing modified system metadata 251, corresponding to the transaction entry metadata 254 and to be lazily transferred into the persistent storage 250. The memory buffers 260 can be comprised by the memory 206 or can be external to the memory 206.

In one or more embodiments, each memory buffer 260 can store modified system metadata 251 corresponding to a result of transaction operation related to a single block or log storage object 252 of the storage log 100 or based on any other suitable unit. Accordingly, in one or more embodiments, a log storage object 252, memory buffer 260 and log hold 180 can correspond to one another in a plurality of sets of log storage objects 252, memory buffers 260 and log holds 180.

In one or more embodiments, the memory buffers 260 can be modified to comprise the modified system metadata 251 in association with the journalling of the transaction log entries 253 (e.g., at step 303).

Also, in connection with the journalling (step 302), memory buffer modification (step 303), and log hold generation and application (step 306), the listing component 214 can populate a first dirty buffer list 270a of the aforementioned set of buffer lists (e.g., at step 304). The first dirty buffer list 270a can be populated with a set of dirty hints (e.g., references or reference hints 273) referring to dirty memory buffers 260 of the set of memory buffers 260. That is, as used herein, the term "dirty" refers to non-synchronized. Accordingly, the first dirty buffer list 270a refers to a set of the memory buffers 260 that comprise modified system metadata 251 that is not yet synchronized to the persistent storage 250.

In one or more embodiments, the reference hints 273 can comprise list metadata 274 that can be stored at one or more list storage objects 272.

It will be appreciated that the first dirty buffer list 270a is the first of a set of buffer lists that can be employed by the logging system 202. The first dirty buffer list 270a can be initially generated in association with the journalling or can have been pre-generated. Additionally, or alternatively, in one or more embodiments, a first dirty buffer list 270a can be split off of a global or common dirty buffer list 270a that is populated as transaction log entries 253 are journalled and memory buffers 260 are prepared.

It will be appreciated that the steps 302, 303, 304 and 306 can be performed in any suitable order and/or at least partially at the same time as one another.

Figure 4:
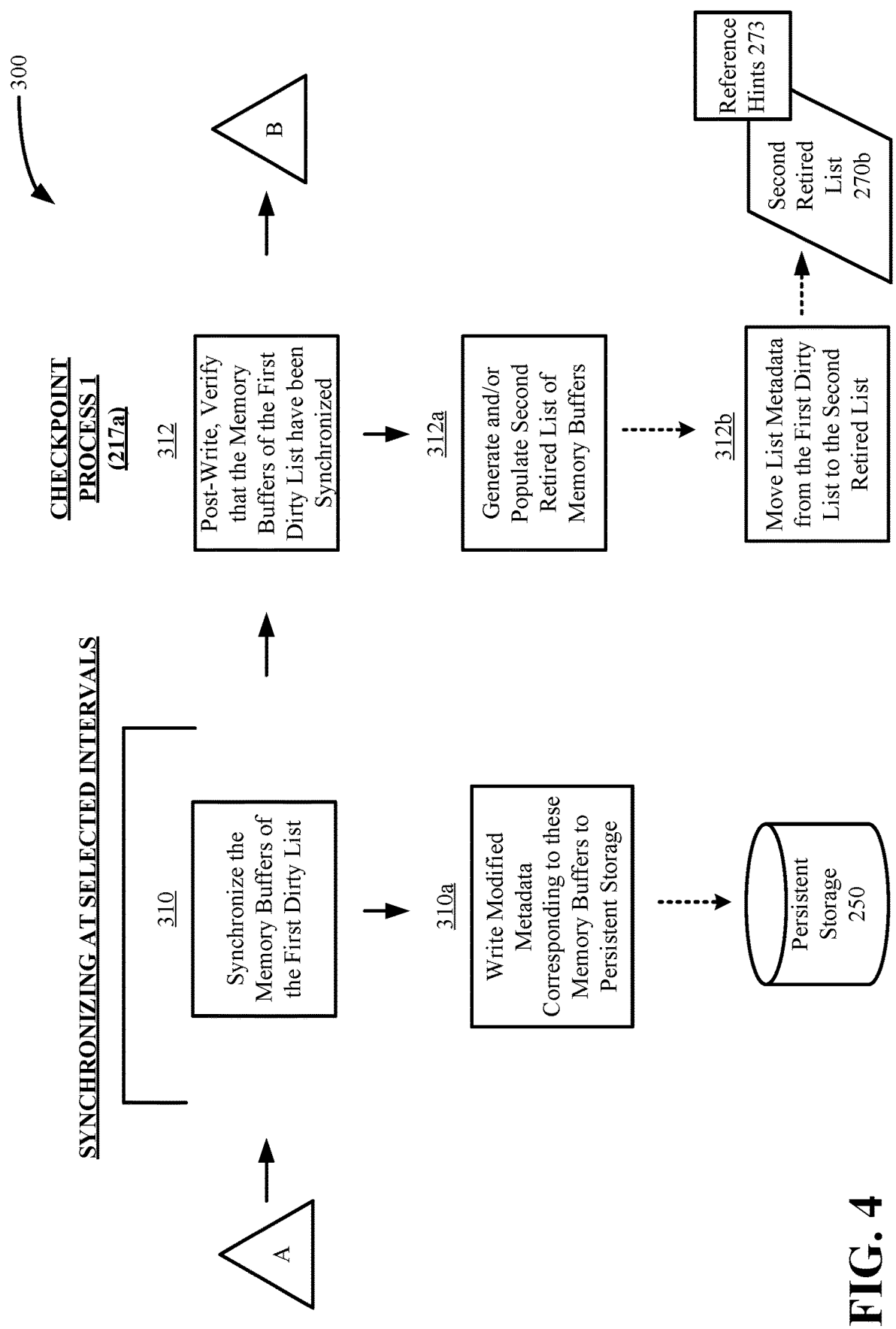
FIG. 4 illustrates a block diagram of another portion of operations that can be performed by the logging system of FIG. 2, in accordance with one or more embodiments and/or implementations described herein.

Turning now to FIG. 4, and still to FIG. 2, a checkpoint 217 can be generated by the checkpoint component 218 at a selected interval. In one or more embodiments, such selected interval can refer to the aforementioned usable log space threshold or to another checkpoint-related usable log space threshold. That is, in response to usable log space at the storage log being determined to have decreased and to have satisfied a defined usable log space threshold (e.g., due to the continued journalling of transaction log entries 253), the checkpoint component 218 can generate and/or assign the checkpoint 217. The usable log space threshold or checkpoint-related usable log space threshold can be defined by a user entity or administrator entity of the logging system 202 or computing device 201 and/or by the transaction journalling component 210.

In one or more embodiments, a checkpoint 217 can be generated and/or assigned in association with lack of space to continue journalling at the storage log 100. In one or more embodiments, a checkpoint 217 can be generated and/or assigned based on an interval separate from a quantity of remaining space at a storage log.

Generally, each checkpoint 217, identified by a checkpoint marker 213 or marker, can reference or identify a checkpoint in the journalling to the storage log and correspond to the reference hints 273 populated (e.g., to the first dirty buffer list 270a) prior to the checkpoint 217. Accordingly, each checkpoint 217 can thus correspond to a set of dirty memory buffers 260, log storage objects 252, transaction log entries 253 and transactions 104.

In use of the logging system 202, after generation of the first checkpoint 217 by the checkpoint component 218, additional checkpoints 217 can be generated relative to journalling to other portions of a storage system, such as to another storage log. However, as will be understood, a next checkpoint 217, of the additional checkpoints, will only correspond to those reference hints 273 tied to the one or more transactions journalled after the first checkpoint 217 has been generated, and so on.

In one or more embodiments, one or more checkpoint markers 213 are not generated, but rather can be pre-generated markers (defined by metadata) and thus can instead be assigned, and thus the checkpoints 217 can be assigned.

Referring still to FIGS. 2 and 4, discussion next turns to the synchronizing component 216 and to the synchronization of the memory buffers 260 of the first dirty list 270a of memory buffers (e.g., to the synchronization of the modified system metadata 251 corresponding to the memory buffers 260 of the first dirty list 270a) to the persistent storage 250 at step 310. It is appreciated that the term "of the first dirty list" or "of" any other list means "represented at the first dirty list" or "represented at" any other list, respectively.

In one or more embodiments, the persistent storage 250 can be at least partially external to the file system 290.

For example, at sub-step 310a, the synchronizing component 216 can execute a write action to write modified system metadata 251 corresponding to the reference hints 273 corresponding to the checkpoint 217 to the persistent storage 250. In one or more embodiments, the synchronizing of the modified system metadata 251 to the persistent storage can be executed at selected intervals that are not associated with the checkpoint 217. Such selected intervals can be controlled by the synchronizing component 216, for example based on a speed of writing, available CPU bandwidth, etc. In one or more embodiments, the synchronizing of the modified system metadata 251 to the persistent storage 250 (e.g., for the transaction log entries 253 prior to the checkpoint 217) can begin prior to assignment of the checkpoint 217, such as where the usable log space threshold or checkpoint-related usable log space threshold has not been satisfied. In one or more other embodiments, the synchronizing of the modified system metadata 251 to the persistent storage 250 can be held (e.g., not started) until satisfying such threshold and/or until the checkpoint 217 corresponding thereto is generated and/or assigned.

Discussion next turns to use of the set of buffer lists 270. Generally, these buffer lists 270 comprise sets of metadata, e.g., list metadata 274, that each refer to a set of memory buffers 260, and which are generated by the listing component 214. As noted above, the references to the memory buffers 260 can be referred to as reference hints 273 (or referred to as hints), and thus a buffer list 270 can comprise and/or have associated therewith a set of reference hints 273.

Use of log holds 180, the synchronization of the modified system metadata 251, and the resetting of varies aspects of and/or associated with the logging system 202, after the synchronization is completed, can be tracked by the logging system 202 via use of the set of buffer lists 270 in connection with the checkpoint 217.

That is, instead of releasing a log hold 180 upon completion of synchronization of modified system metadata 251 to persistent storage 250 (e.g., as in existing frameworks), notice (e.g., the reference hints 273) is moved along a set of three of the buffer lists 270. Each of the buffer lists 270 of the set corresponds only to a single checkpoint 217, and thus only to a set of memory buffers 260 associated with such single checkpoint 217.

In use, each checkpoint 217 can be associated with a set of three checkpoint processes that are tied to the use of the three successive buffer lists 270. A first checkpoint process 217a can correspond to movement of individual reference hints 273 between the first dirty memory buffer list 270a and the second retired memory buffer list 270b, upon synchronization of individual dirty memory buffers 260. A second checkpoint process 217b can correspond to a verification that all of the memory buffers 260 corresponding to the set of transactions 104 associated with the checkpoint 217 have been synchronized (e.g., that the modified system metadata 251 associated therewith has been synchronized). This checkpoint also can correspond to movement of reference hits to a third retired memory buffer list 270c from the second retired memory buffer list 270b. A third checkpoint process 217c can correspond to release of log holds 180, clearing of log storage objects 252, clearing of list storage objects 272, clearing of memory buffers 260, and resetting of heads and tails of chunks.

Referring still to FIGS. 2 and 4, discussion turns to the first checkpoint process 217a. Generally, at the first checkpoint process 217a, a thread component 219 can perform a post-write verification that a dirty memory buffer 260 has been synchronized (e.g., at step 312). At step 312a in response to the determination by the thread component 219, the listing component 214 can generate the second retired list 270b of memory buffers and/or populate an already-generated second retired list 270b. At step 312b, individual reference hints 273 of the first dirty list 270a are transitioned, by the listing component 214, to the second retired list 270b.

Figure 5:
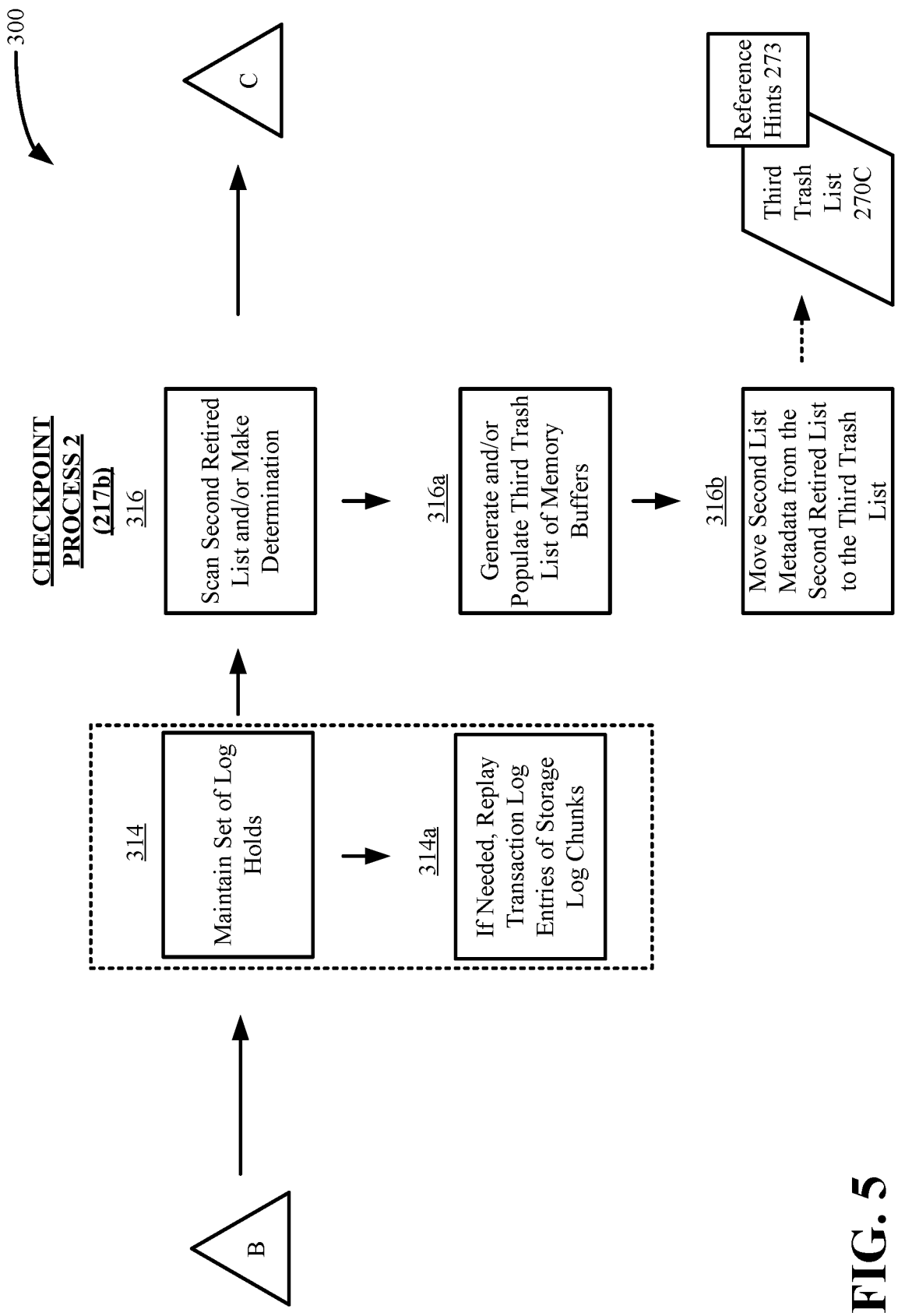
FIG. 5 illustrates a block diagram of still another portion of operations that can be performed by the logging system of FIG. 2, in accordance with one or more embodiments and/or implementations described herein.

Discussion next turns to the second checkpoint process 217b, and thus also to FIG. 5. Generally, at the second checkpoint process 217b, the thread component 219 can perform another post-write verification for the full set of dirty memory buffers 260 corresponding to the respective checkpoint 217. That is, the thread component 219 can confirm that all dirty memory buffers 260 associated with the respective checkpoint 217 have been synchronized (e.g., at step 316). At step 316a, in response to the determination by the thread component 219, the listing component 214 can generate the third trash list 270c of memory buffers and/or populate an already-generated third trash list 270c. At step 316b, all reference hints 273 of the second retired list 270b are transitioned (e.g., a group transition) by the listing component 214, to the third trash list 270c. The reference hints 273 can all be transitioned at once or can instead be transitioned in portions of the group of reference hints 273.

Figure 6:
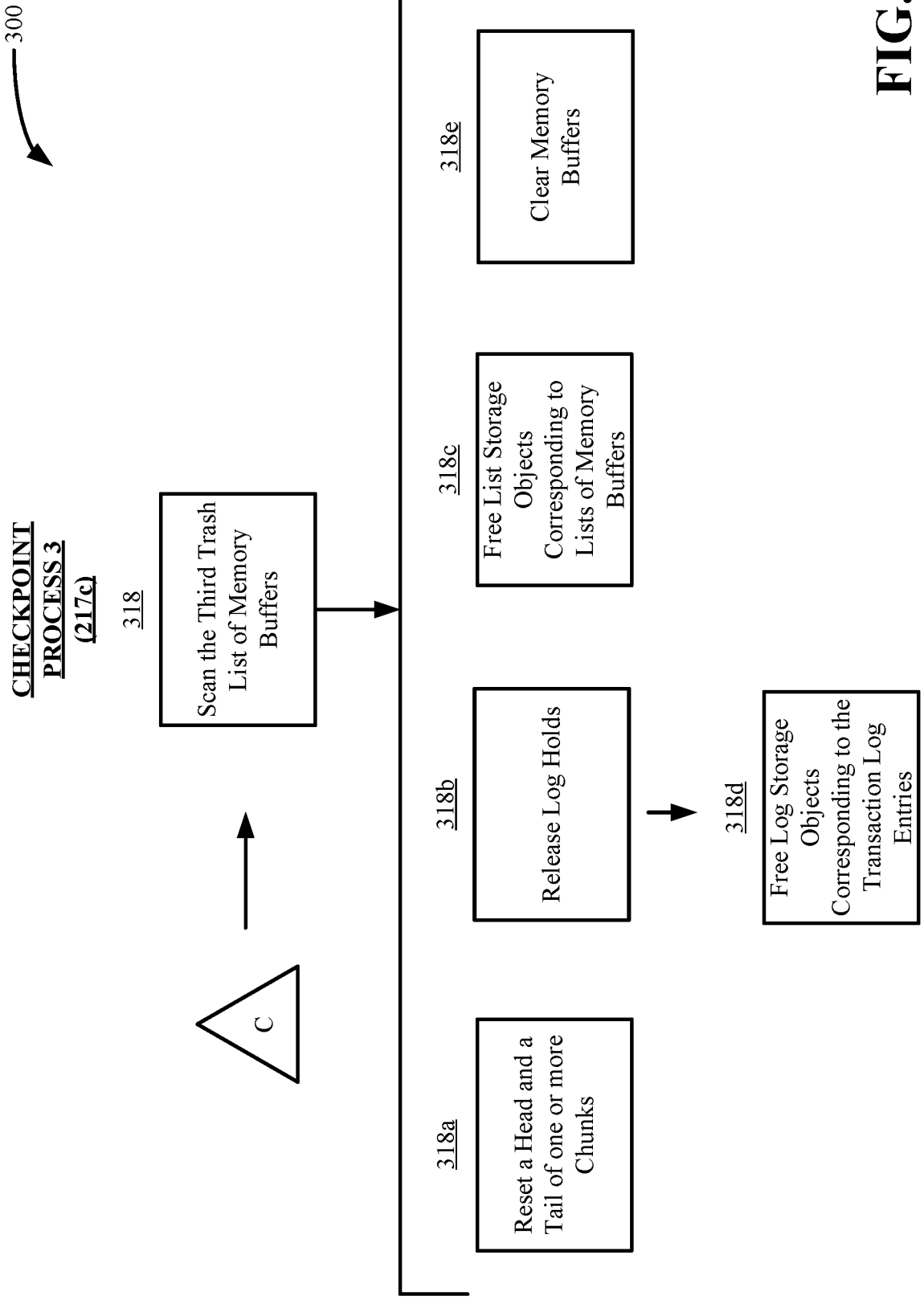
FIG. 6 illustrates a block diagram of yet another portion of operations that can be performed by the logging system of FIG. 2, in accordance with one or more embodiments and/or implementations described herein.

Discussion now turns to FIG. 6 and to the third checkpoint process 217c. Generally, at the third checkpoint process 217c, a series of reconciliation processes (e.g., which can comprise clearing, releasing and/or resetting processes) can be completed for the log holds 180, log storage objects 252, list storage objects 272, memory buffers 260, and/or heads (H) and tails (T) of the chunks 102 of the storage log 100.

That is, at step 318, the thread component 219 can scan the third trash list 270c of memory buffers 260. As with the second checkpoint process 217b, the scanning by the thread component 219 can be performed one or more iterations for the subset of memory buffers 260 corresponding to the respective checkpoint 217.

In response to the scanning of each reference hint at the third trash list 270c, the logging system 202 can perform one or more of the reconciliation steps 318a, 318b, 318c, 318d and 318e. Put another way, in response to the synchronizing having been determined (e.g., at step 318, step 316, step 312 and/or another step) to have been completed for the set of memory buffers 260 being moved along the memory buffer lists 270 and corresponding to the respective checkpoint 217, steps 318a, 318b (and sub-step 318d), 318c and 318e can be performed. In one or more embodiments, any one or more of these steps can be performed at least partially in parallel with any one or more other ones of these steps. In one or more embodiments, any one or more of these steps can be performed relative to plural reference hints 273 at least partially in parallel with one another.

In one or more embodiments, in connection with step 318, the thread component 219 can perform an additional scanning of the first dirty list 270a to re-verify that all memory buffers 260 corresponding to the checkpoint 217 have been synchronized. In one or more other embodiments, this additional re-verification action can be omitted.

At step 318a, the resetting component 220 can reset a head (H) and a tail (T) of one or more respective chunks 102 after the determination at step 318 (and/or after the re-verification associated with step 318) is executed. It is noted that a head need not move during synchronizing of transactions of a chunk 102 when using the logging system 202, as contrasted with existing approaches.

At step 318b, log holds 180 of the set of log holds that correspond to the memory buffers 260, which correspond to the checkpoint component 217, can be released by the log hold component 212. That is, metadata representing the log holds 180 can be cleared. In one or more embodiments, the release can be a lazy release.

In association with the release of the log holds 180, the resetting component 220 can clear the log storage objects 252 comprising the transaction log entries 253 corresponding to the memory buffers 260 that correspond to the checkpoint component 217. In this way, in the case of a file system or computing device issue, the file system can be maintained as consistent after the update of the file system 290 (e.g., by way of synchronization of the modified system metadata 251).

At step 318c, the list storage objects 272 comprising the list metadata 274 of the reference hints 273, corresponding to the checkpoint component 217, can be cleared.

At step 318e, the memory buffers 260 corresponding to the checkpoint 217 can be cleared.

Discussion now turns back briefly to FIG. 5, to step 314 and to the benefit of use of the log holds 180 in the case of a crash, failure, and/or other issue with the computing device 201, associated file system 290, and/or logging system 202. This discussion can be relevant to access to the transaction log entries 253 at any point during an iteration of storage log use and subsequent metadata synchronization, as signified by the use of the dotted-line box surrounding step 314 and sub-step 314a. That is, discussion regarding step 314 is not just relevant to a point in such iteration between the first checkpoint process 217a and second checkpoint process 217b, as is particularly illustrated at FIG. 5. Rather the placement of step 314 at FIG. 5, among the order of the other steps of set 300 of operations, is meant to symbolize the benefit of the log holds 180 and of the checkpoint 217. That is, step 314 can be performed out of the order set forth at FIGS. 3 to 6, where suitable.

As discussed above, to ensure that, in the case of a file system or computing device issue, the file system metadata is consistent before the update of the file system 290, the set of log holds 180 corresponding to a checkpoint 217 can allow for maintaining transaction log entries 253 of transactions 104 written to the storage log 100, without the storage log space defining the storage log 100 being preemptively cleared. As such, modified system metadata 251 not yet synchronized is able to be regenerated if needed, such as by replaying the transaction log entries 253.

At step 314, the logging system 202, and particularly the log hold component 212, can maintain the set of log holds 180, which correspond to the set of memory buffers 260, which in turn correspond to the checkpoint 217, until all dirty memory buffers 260 that represent the checkpoint 217, have been synchronized to the persistent storage 250. That is, the logging system 202 can prevent the reuse of the log space of the storage log 100 until writing of the modified system metadata 251 corresponding to all transaction log entries 253 of the checkpoint 217, has been executed.

For example, in the case of a system issue, at the request of an entity, and/or for any other suitable reason, in response to determining that not all (e.g., less than all) of the dirty memory buffers 260 of the first dirty list 270a of memory buffers are synchronized, the replay component 222 can scan at least a subset of the transaction log entries 253 that have been journalled to, and not yet released from, the storage log 100, such as in a sequential order of the subset of the transaction log entries 253, due to the maintaining of the set of log holds 180.

In this way, a crash or other issue can be remediated. Put another way, in response to all modified system metadata 251 corresponding to all transaction log entries 253 of the checkpoint 217 being determined not to have been written yet, the replay component 222 can scan at least a subset of the transaction log entries 253 that have been journalled to, and not yet released from, the storage log 100, such as in a sequential order of the subset of the transaction log entries 253, due to the preventing of the reuse of the log space.

Example Operations

Figure 8:
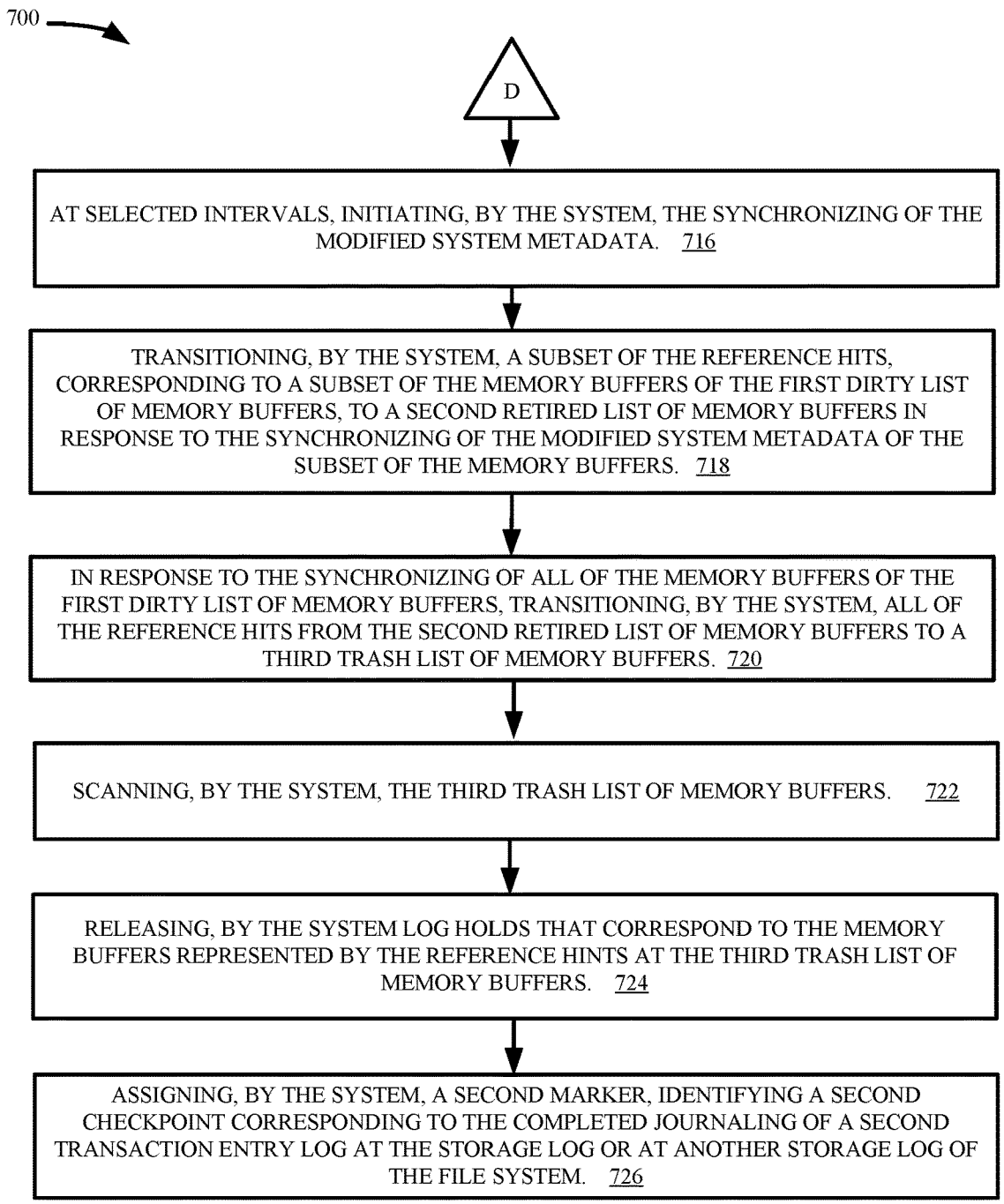
FIG. 8 illustrates a continuation of the process flow diagram of FIG. 7 of a method of tracking of synchronizing of modified system metadata to persistent storage and of subsequent clearing of storage log space, in accordance with one or more embodiments and/or implementations described herein.

Turning now to FIGS. 7 and 8, a process flow comprising a set of operations for providing for tracking of transaction entry metadata during synchronizing of the modified system metadata to persistent storage is set forth relative to FIGS. 1-6. One or more elements, objects and/or components referenced in the process flow 700 can be those of schematics 100-600. Repetitive description of like elements and/or processes employed in previously described embodiments is omitted for sake of brevity.

At operation 702, the process flow 700 can comprise journalling, by a system operatively coupled to a processor (e.g., transaction journalling component 210), a transaction log entry (e.g., transaction log entry 253) to log storage objects (e.g., log storage objects 252) defining multiple chunks (e.g., chunks 102) of a storage log (e.g., storage log 100) associated with a file system (e.g., file system 290), wherein the transaction log entry comprises instructions for fulfilling a transaction (e.g., transaction 104), and wherein the transaction defines a change to the file system.

At operation 704, the process flow 700 can comprise modifying, by the system (e.g., transaction journalling component 210), a set of memory buffers (e.g., memory buffers 260) to comprise modified system metadata (e.g., modified system metadata 251) for updating the file system, wherein the modified system metadata is to be synchronized to persistent storage (e.g., persistent storage 250) to complete the transaction.

At operation 706, the process flow 700 can comprise, in connection with the modifying of the set of memory buffers, generating, by the system (e.g., log hold component 212), a set of log holds (e.g., log holds 180) corresponding to the set of memory buffers.

At operation 708, the process flow 700 can comprise, maintaining, by the system (e.g., log hold component 212), the set of log holds until the modified system metadata of the memory buffers of a first dirty list of memory buffers (e.g., first dirty list 270a) has been synchronized to the persistent storage.

At operation 710, the process flow 700 can comprise populating, by the system (e.g., listing component 214), the first dirty list of memory buffers with reference hints (e.g., reference hints 273) that represent the set of memory buffers that correspond to the transaction and that comprise the modified system metadata not yet synchronized to persistent storage.

At operation 712, the process flow 700 can comprise assigning, by the system (e.g., checkpoint component 218), a marker (e.g., checkpoint marker 213) identifying a checkpoint (e.g., checkpoint 217) in the journalling to the storage log, wherein the checkpoint corresponds to the reference hints populated prior to the checkpoint.

At operation 714, the process flow 700 can comprise synchronizing, by the system (e.g., synchronizing component 216), the modified system metadata of memory buffers that have not yet been synchronized to the persistent storage.

At operation 716, the process flow 700 can comprise, at selected intervals, initiating, by the system (e.g., synchronizing component 216), the synchronizing of the modified system metadata.

At operation 718, the process flow 700 can comprise, transitioning, by the system (e.g., listing component 214), a subset of the reference hits, corresponding to a subset of the memory buffers of the first dirty list of memory buffers, to a second retired list of memory buffers (e.g., second retired list 270b) in response to the synchronizing of the modified system metadata of the subset of the memory buffers.

At operation 720, the process flow 700 can comprise, in response to the synchronizing of all of the memory buffers of the first dirty list of memory buffers, transitioning, by the system (e.g., listing component 214), all of the reference hits from the second retired list of memory buffers to a third trash list of memory buffers (e.g., third trash list 270c).

At operation 722, the process flow 700 can comprise scanning, by the system (e.g., thread component 219), the third trash list of memory buffers.

At operation 724, the process flow 700 can comprise releasing, by the system (e.g., log hold component 212), log holds that correspond to the memory buffers represented by the reference hints at the third trash list of memory buffers.

At operation 726, the process flow 700 can comprise assigning, by the system (e.g., checkpoint component 218), a second marker, identifying a second checkpoint corresponding to the completed journalling of a second transaction log entry at the storage log or at another storage log of the file system.

Turning now to FIGS. 9 and 10, another process flow comprising a set of operations for providing for tracking of transaction entry metadata during synchronizing of the modified system metadata to persistent storage is set forth relative to FIGS. 1-6. One or more elements, objects and/or components referenced in the process flow 900 can be those of schematics 100-600. Repetitive description of like elements and/or processes employed in previously described embodiments is omitted for sake of brevity.

At operation 902, the process flow 900 can comprise storing, by a system operatively coupled to a processor (e.g., transaction journalling component 210), a set of transaction log entries (e.g., transaction log entries 253) at log space of a storage log (e.g., storage log 100) associated with a file system (file system 290), wherein the transaction log entries comprise instructions for fulfilling a set of transactions (e.g., transactions 104), and wherein the transactions define changes to the file system.

At operation 904, the process flow 900 can comprise assigning, by the system (e.g., checkpoint component 218), a checkpoint marker (e.g., checkpoint marker 213) corresponding to a set of log storage objects (e.g., log storage objects 242) of the storage log at which the transaction log entries are stored.

At operation 906, the process flow 900 can comprise, based on the checkpoint marker, preventing, by the system (e.g., log hold component 212), reuse of the log space until writing of all modified system metadata (e.g., modified system metadata 251) corresponding to the transaction log entries has been executed.

At operation 908, the process flow 900 can comprise, generating, by the system (e.g., log hold component 212), a set of log holds (e.g., log holds 180) corresponding to the set of log storage objects enabling the log space.

At operation 910, the process flow 900 can comprise maintaining, by the system (e.g., log hold component 212), the log holds to prevent the reuse of the log space.

At operation 912, the process flow 900 can comprise employing, by the system (e.g., listing component 214), a set of lists (e.g., buffer lists 270) associated with the checkpoint marker, wherein the lists reference a set of memory buffers (e.g., buffers 260) that comprise the modified system metadata, and wherein the lists provide for tracking of the progress of synchronization of the modified system metadata from the set of memory buffers.

At operation 914, the process flow 900 can comprise, preventing, by the system (e.g., log hold component 212), the reuse of the log space until a set of reference hints (e.g., reference hints 273), corresponding to the set of memory buffers, have been transitioned through the set of lists.

At operation 916, the process flow 900 can comprise, executing, by the system (e.g., synchronizing component 216), the writing of the modified system metadata to the persistent storage at selected intervals not driven by the assigning of the checkpoint marker.

At operation 918, the process flow 900 can comprise, as a result of the writing of the modified system metadata to the persistent storage, identifying, by the system (e.g., log hold component 212 and/or thread component 219), the log space comprising the transaction log entries as being available to be released by the system.

Figure 12:
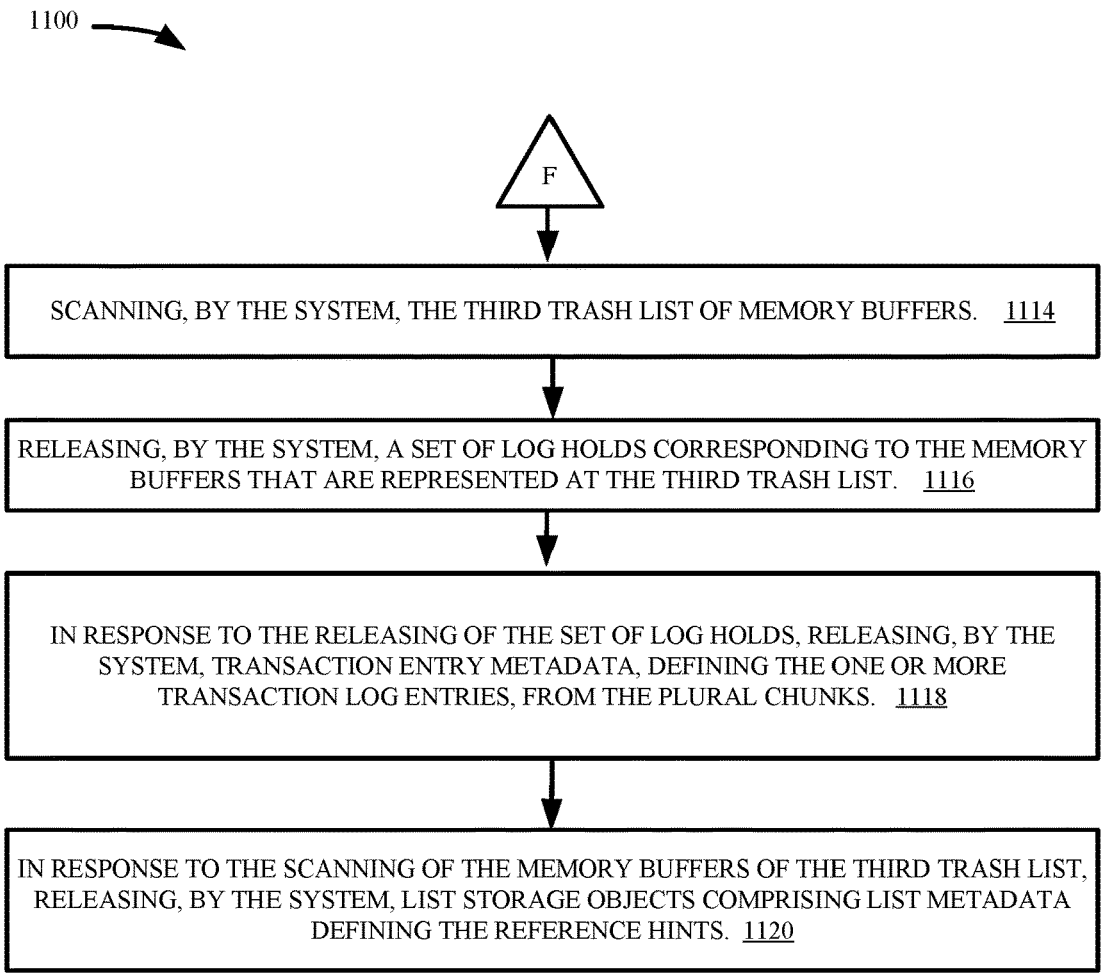
FIG. 12 illustrates a continuation of the process flow diagram of FIG. 11 of a method of tracking of synchronizing of modified system metadata to persistent storage and of subsequent clearing of storage log space, in accordance with one or more embodiments and/or implementations described herein.

Turning now to FIGS. 11 and 12, still another process flow comprising a set of operations for providing for tracking of transaction entry metadata during synchronizing of the modified system metadata to persistent storage is set forth relative to FIGS. 1-6. One or more elements, objects and/or components referenced in the process flow 1100 can be those of schematics 100-600. Repetitive description of like elements and/or processes employed in previously described embodiments is omitted for sake of brevity.

At operation 1102, the process flow 1100 can comprise populating, by a system operatively coupled to a processor (e.g., listing component 214), a first dirty list (e.g., first dirty list 270a) of memory buffers (e.g., memory buffers 260) with reference hints (e.g., reference hints 273) referring to memory buffers (e.g., memory buffers 260) comprising modified system metadata (e.g., modified system metadata 251) for being synchronized to persistent storage (e.g., persistent storage 250) to fulfill one or more transactions (e.g., transactions 104) at a file system (e.g., file system 290).

At operation 1104, the process flow 1100 can comprise executing, by the system (e.g., listing component 214), the populating of the first dirty list of memory buffers in connection with the journalling of one or more transaction log entries (e.g., transaction log entries 253) and modification of the memory buffers to comprise the modified system metadata.

At operation 1106, the process flow 1100 can comprise assigning, by the system (e.g., checkpoint component 218), a checkpoint marker (e.g., checkpoint marker 213) upon completion of journalling of the one or more transaction log entries, corresponding to the one or more transactions, to plural chunks (e.g., chunks 102) of a storage system (e.g., storage system comprising storage log 100) associated with the file system.

At operation 1108, the process flow 1100 can comprise in association with the checkpoint marker, transitioning, by the system (e.g., listing component 214), the reference hints to a second retired list (e.g., second retired list 270b) of memory buffers upon the synchronization of the modified system metadata, which is associated with an individual one or more memory buffers of the memory buffers, to the persistent storage.

At operation 1110, the process flow 1100 can comprise, upon synchronization of all modified system metadata of the memory buffers associated with the checkpoint marker, and thus associated with the one or more transaction log entries, executing, by the system (e.g., listing component 214), a group transitioning of the reference hints (e.g., reference hints 273) to a third trash list (e.g., third trash list 270c) of memory buffers.

At operation 1112, the process flow 1100 can comprise, transitioning, by the system (e.g., listing component 214), only the reference hints associated with the memory buffers associated with the checkpoint marker to the second retired list and third trash list.

At operation 1114, the process flow 1100 can comprise scanning, by the system (e.g., thread component 219), the third trash list of memory buffers.

At operation 1116, the process flow 1100 can comprise releasing, by the system (e.g., log hold component 212), a set of log holds corresponding to the memory buffers that are represented at the third trash list.

At operation 1118, the process flow 1100 can comprise, in response to the releasing of the set of log holds, releasing, by the system (e.g., resetting component 220), transaction entry metadata, defining the one or more transaction log entries, from the plural chunks.

At operation 1120, the process flow 1100 can comprise in response to the scanning of the memory buffers of the third trash list, releasing, by the system (e.g., resetting component 220), list storage objects (e.g., list storage objects 272) comprising list metadata defining the reference hints.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of the figures provided herein are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, described is technology that facilitates journalling a transaction log entry to chunks of storage while allowing for obtaining of modified system metadata associated therewith in the case of a computing device issue. An associated method comprises at least storing, by a system operatively coupled to a processor, a transaction log entry at log space of a storage log associated with a file system, wherein the transaction log entry comprises instructions for fulfilling the transaction, and wherein the transaction defines a change to the file system, generating a checkpoint marker corresponding to a set of log storage objects of the storage log at which the transaction log entry is store, and based on the checkpoint marker, preventing, by the system, reuse of the log space until writing of all modified system metadata corresponding to the transaction log entry has been executed.

An example benefit of one or more of the above-indicated method, system and/or non-transitory computer-readable medium can be reduction in the number of validations performed to allow for release of log storage objects of the storage log. For example, the one or more embodiments herein can employ a checkpoint-based system that is associated with a set of lists for tracking synchronization of modified system metadata, to fulfill a transaction of the file system, to persistent storage. The tracking can also be employed for triggering subsequent release of log space corresponding to the transaction, list space corresponding to the set of lists, and resetting of the heads and tails of the plural chunks of the storage system. That is, a validation at each persistent storage write of each chunk of modified system metadata (e.g., from a single one or more memory buffers), to determine if modified system metadata from all previous log storage objects in a transaction sequence order have been written, as performed in existing frameworks, can be omitted via the one or more embodiments described herein.

Another example benefit can be functioning without a global bitmap, head or tail for the set of chunks, which global bitmap, head or tail can impede scalability of the one or more embodiments described herein. By using a set of log holds and maintaining transaction entry metadata defining transactions at corresponding log storage objects (e.g., defining the log), order of writes to persistent storage can be omitted and the log chunks (also herein referred to as chunks) can be initially journalled, and subsequently memory buffers can be synchronized, in any suitable order, even at least partially in parallel with one another (e.g., at least partially concurrently with one another). This is in contrast to existing frameworks where transaction metadata is cleared in specific order from the storage log upon synchronization.

Indeed, in view of the one or more embodiments described herein, a practical application of above-indicated method, system and/or non-transitory computer-readable medium can be an ability to employ limited validation when writing modified system metadata to persistent storage for updating a file system, which modified system metadata corresponds to one or more transaction log entries, thereby reducing validation costs as compared to existing approaches.

Furthermore, the one or more embodiments described herein can perform the synchronizing of modified system metadata corresponding to multiple chunks or corresponding to multiple logs without validating any ordering constraints. That is, an order of writes to persistent storage can be omitted and the chunks can be initially journalled and subsequently synchronized in any suitable order, such as at least partially in parallel with one another. These are useful and practical applications of computers, thus providing enhanced (e.g., improved and/or optimized) operation of the hardware and/or software components for employing multiple log chunks or multiple logs for a same set of transactions involving a file system. Overall, such tools can constitute a concrete and tangible technical and/or physical improvement in the fields of log retirement transaction order monitoring and file system updates more generally.

Furthermore, one or more embodiments described herein can be employed in a real-world system based on the disclosed teachings. For example, one or more embodiments described herein can function with a computer system and/or one or more servers for internet, cloud and/or internal/external networks to perform log use and writing of data to persistent storage based on logged transaction entry metadata.

Further, one or more embodiments described herein are inherently and/or inextricably tied to computer technology and cannot be implemented outside of a computing environment. For example, one or more processes performed by one or more embodiments described herein can more efficiently, and even more feasibly, enable, monitor and/or track retirement order of transactions of a storage log of a computer system as compared to existing systems and/or techniques. Systems, computer-implemented methods and/or computer program products facilitating performance of these processes are of great utility in the field of computer storage logs and file system updates and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively operate processes that perform transaction log entry journalling, modified system metadata synchronizing, generation and application of log holds, and/or scanning of memory buffer lists as the one or more embodiments described herein can facilitate these processes. And, neither can the human mind nor a human with pen and paper automatically perform one or more of the processes as conducted by one or more embodiments described herein.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not described herein for the sake of brevity, but known by those of skill in the art.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud operation systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 13:
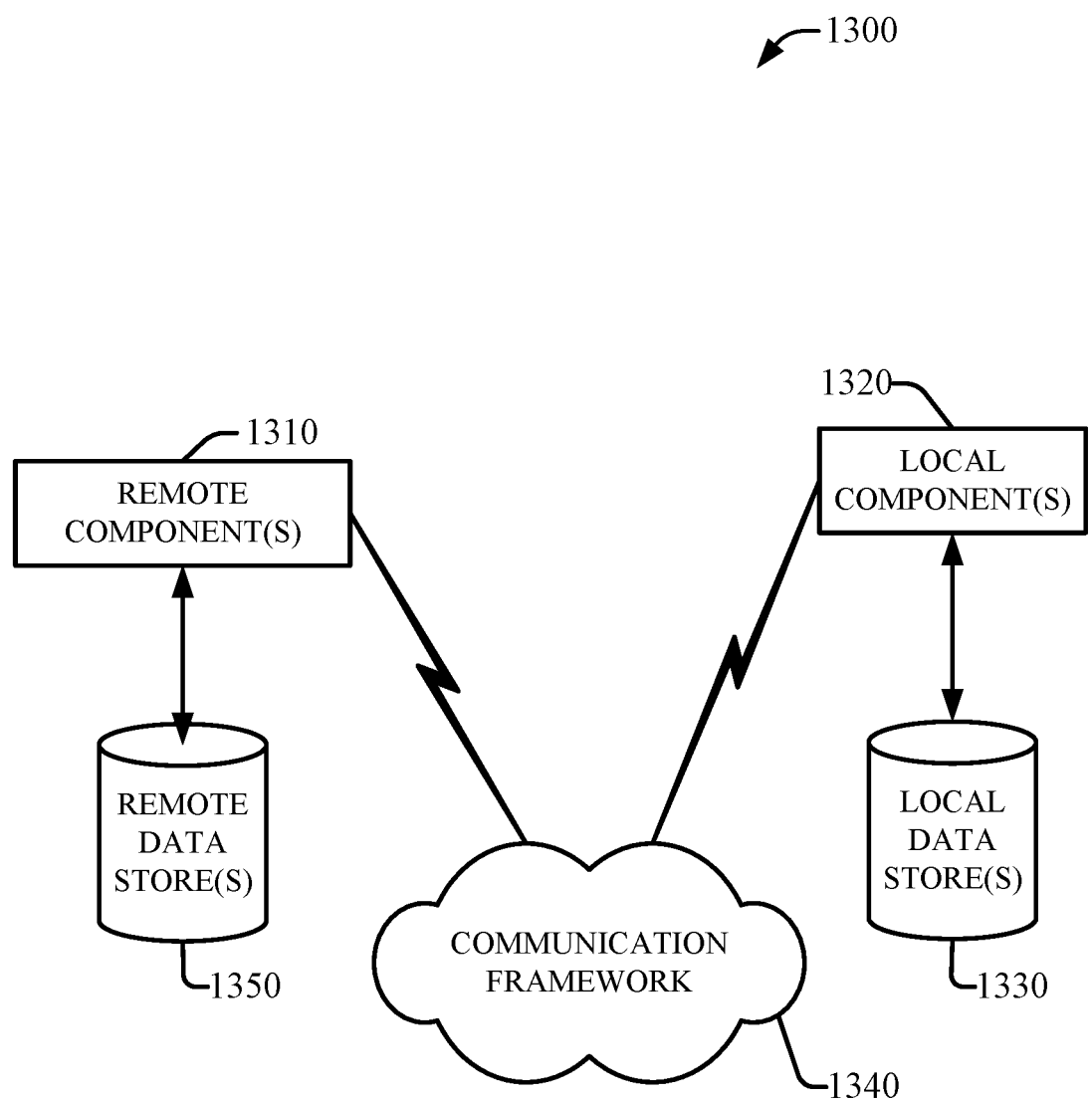
FIG. 13 illustrates a block diagram of an example operating environment into which embodiments of the subject matter described herein can be incorporated.

FIG. 13 is a schematic block diagram of an operating environment 1300 with which the described subject matter can interact. The operating environment 1300 comprises one or more remote component(s) 1310. The remote component(s) 1310 can be hardware and/or software (e.g., threads, processes, computing devices). In one or more embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The operating environment 1300 also comprises one or more local component(s) 1320. The local component(s) 1320 can be hardware and/or software (e.g., threads, processes, computing devices). In one or more embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The operating environment 1300 comprises a communication framework 1340 that can be employed to facilitate communications between the remote component(s) 1310 and the local component(s) 1320, and can comprise an air interface, e.g., interface of a UMTS network, via an LTE network, etc. Remote component(s) 1310 can be operably connected to one or more remote data store(s) 1350, such as a hard drive, solid state drive, subscriber identity module (SIM) card, electronic SIM (eSIM), device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Example Computing Environment

Figure 14:
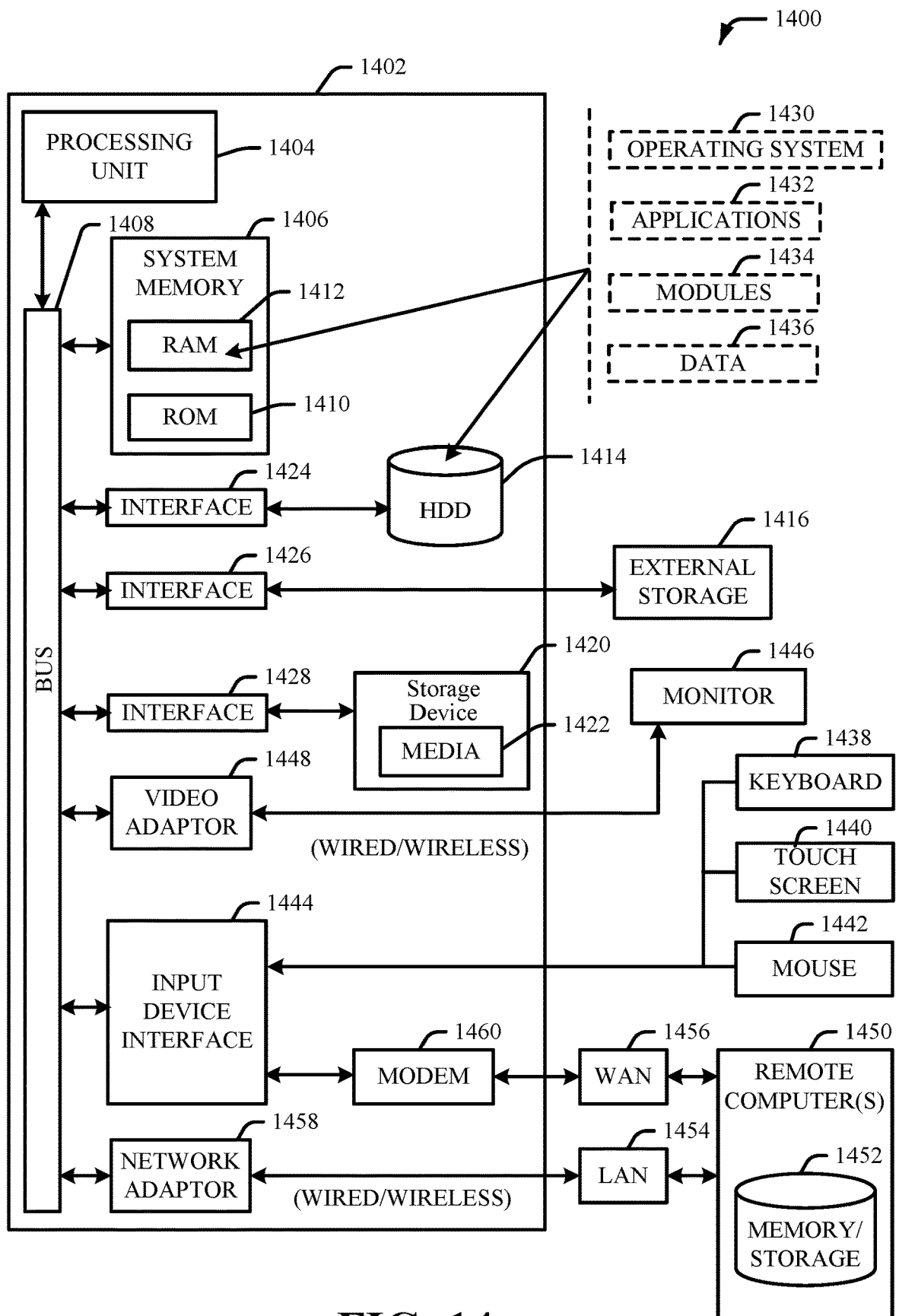
FIG. 14 illustrates an example schematic block diagram of a computing environment with which the subject matter described herein can interact and/or be implemented at least in part.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform tasks or implement abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 14, the example computing environment 1400 which can implement one or more embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in computing environment 1400, a solid-state drive (SSD) could be used in addition to, or in place of, an HDD 1414.

Other internal or external storage can include at least one other storage device 1420 with storage media 1422 (e.g., a solid-state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera, a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can also be connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer 1450. The remote computer 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. The network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a defined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of these instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used, or modifications and additions can be made to the described implementation for performing the same or equivalent function of the corresponding implementation without deviating therefrom. Still further, multiple processing chips or multiple devices can share the performance of one or more functions described herein, and similarly, storage can be implemented across different devices. Accordingly, the various embodiments are not to be limited to any single implementation, but rather are to be construed in breadth, spirit, and scope in accordance with the appended claims.

What is claimed is:

1. A system, comprising:
at least one processor; and
at least one memory that stores executable instructions that, when executed by the at least one processor, facilitate performance of operations, comprising:
journalling a transaction log entry to log storage objects defining multiple chunks of a storage log associated with a file system, wherein the transaction log entry comprises instructions for fulfilling a transaction, and wherein the transaction defines a change to the file system;
modifying a set of memory buffers to comprise modified system metadata for updating the file system, wherein the modified system metadata is to be synchronized to persistent storage to complete the transaction;
populating a first dirty list of memory buffers with reference hints that represent the set of memory buffers that correspond to the transaction and that comprise the modified system metadata not yet synchronized to persistent storage;
assigning a marker identifying a checkpoint in the journalling to the storage log, wherein the checkpoint corresponds to the reference hints populated prior to the checkpoint;
synchronizing the modified system metadata of memory buffers that have not yet been synchronized to the persistent storage;
transitioning a subset of the reference hints, corresponding to a subset of the memory buffers of the first dirty list of memory buffers, to a second retired list of memory buffers in response to the synchronizing of the modified system metadata of the subset of the memory buffers; and
in response to the synchronizing of all of the memory buffers of the first dirty list of memory buffers, transitioning all of the reference hits from the second retired list of memory buffers to a third trash list of memory buffers.

2. The system of claim 1, wherein the operations further comprise:
in connection with the modifying of the set of memory buffers, generating a set of log holds corresponding to the set of memory buffers.

3. The system of claim 2, wherein the operations further comprise:
maintaining the set of log holds until the modified system metadata of the memory buffers of the first dirty list of memory buffers has been synchronized to the persistent storage.

4. The system of claim 1, wherein the operations further comprise:
at selected intervals, initiating the synchronizing of the modified system metadata.

5. The system of claim 1, wherein the operations further comprise:
scanning the third trash list of memory buffers.

6. The system of claim 5, wherein the operations further comprise:
releasing log holds that correspond to the memory buffers represented by the reference hints at the third trash list of memory buffers.

7. The system of claim 1, wherein the operations further comprise:
assigning a second marker, identifying a second checkpoint corresponding to the completed journalling of a second transaction log entry at the storage log or at another storage log of the file system.

8. A method, comprising:
journalling, by a system comprising at least one processor, a transaction log entry to log storage objects defining multiple chunks of a storage log associated with a file system, wherein the transaction log entry comprises instructions for fulfilling a transaction, and wherein the transaction defines a change to the file system;
modifying, by the system, a set of memory buffers to comprise modified system metadata for updating the file system, wherein the modified system metadata is to be synchronized to persistent storage to complete the transaction;
populating, by the system, a first dirty list of memory buffers with reference hints that represent the set of memory buffers that correspond to the transaction and that comprise the modified system metadata not yet synchronized to persistent storage;
assigning, by the system, a marker identifying a checkpoint in the journalling to the storage log, wherein the checkpoint corresponds to the reference hints populated prior to the checkpoint; and synchronizing, by the system, the modified system metadata of memory buffers that have not yet been synchronized to the persistent storage;

transitioning, by the system, a subset of the reference hints, corresponding to a subset of the memory buffers of the first dirty list of memory buffers, to a second retired list of memory buffers in response to the synchronizing of the modified system metadata of the subset of the memory buffers; and in response to the synchronizing of all of the memory buffers of the first dirty list of memory buffers, transitioning, by the system, all of the reference hits from the second retired list of memory buffers to a third trash list of memory buffers.

9. The method of claim 8, further comprising:
in connection with the modifying of the set of memory buffers, generating, by the system, a set of log holds corresponding to the set of memory buffers.

10. The method of claim 9, further comprising:
maintaining, by the system, the set of log holds until the modified system metadata of the memory buffers of the first dirty list of memory buffers has been synchronized to the persistent storage.

11. The method of claim 8, further comprising:
at selected intervals, initiating, by the system, the synchronizing of the modified system metadata.

12. The method of claim 8, further comprising:
scanning, by the system, the third trash list of memory buffers.

13. The method of claim 12, further comprising:
releasing log holds that correspond to the memory buffers represented by the reference hints at the third trash list of memory buffers.

14. The method of claim 8, further comprising:
assigning, by the system, a second marker, identifying a second checkpoint corresponding to the completed journalling of a second transaction log entry at the storage log or at another storage log of the file system.

15. A non-transitory machine-readable medium, comprising executable instructions that, when executed by a processor, facilitate performance of operations, the operations comprising:
journalling a transaction log entry to log storage objects defining multiple chunks of a storage log associated with a file system, wherein the transaction log entry comprises instructions for fulfilling a transaction, and wherein the transaction defines a change to the file system;

modifying a set of memory buffers to comprise modified system metadata for updating the file system, wherein the modified system metadata is to be synchronized to persistent storage to complete the transaction;

populating a first dirty list of memory buffers with reference hints that represent the set of memory buffers that correspond to the transaction and that comprise the modified system metadata not yet synchronized to persistent storage;

assigning a marker identifying a checkpoint in the journalling to the storage log, wherein the checkpoint corresponds to the reference hints populated prior to the checkpoint; and synchronizing the modified system metadata of memory buffers that have not yet been synchronized to the persistent storage;

transitioning a subset of the reference hints, corresponding to a subset of the memory buffers of the first dirty list of memory buffers, to a second retired list of memory buffers in response to the synchronizing of the modified system metadata of the subset of the memory buffers; and in response to the synchronizing of all of the memory buffers of the first dirty list of memory buffers, transitioning all of the reference hits from the second retired list of memory buffers to a third trash list of memory buffers.

16. The non-transitory machine-readable medium of claim 15, wherein the operations further comprise:
in connection with the modifying of the set of memory buffers, generating a set of log holds corresponding to the set of memory buffers.

17. The non-transitory machine-readable medium of claim 16, wherein the operations further comprise:
maintaining the set of log holds until the modified system metadata of the memory buffers of the first dirty list of memory buffers has been synchronized to the persistent storage.

18. The non-transitory machine-readable medium of claim 15, wherein the operations further comprise:
at selected intervals, initiating the synchronizing of the modified system metadata.

19. The non-transitory machine-readable medium of claim 15, wherein the operations further comprise:
scanning the third trash list of memory buffers; and
releasing log holds that correspond to the memory buffers represented by the reference hints at the third trash list of memory buffers.

20. The non-transitory machine-readable medium of claim 15, wherein the operations further comprise:
assigning a second marker, identifying a second checkpoint corresponding to the completed journalling of a second transaction log entry at the storage log or at another storage log of the file system.

* * * * *